(12) United States Patent
Pidathala et al.

(10) Patent No.: US 10,467,411 B1
(45) Date of Patent: Nov. 5, 2019

(54) SYSTEM AND METHOD FOR GENERATING A MALWARE IDENTIFIER

(71) Applicant: FireEye, Inc., Milpitas, CA (US)

(72) Inventors: Vinay K. Pidathala, Milpitas, CA (US); Zheng Bu, Fremont, CA (US); Ashar Aziz, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 184 days.

(21) Appl. No.: 15/688,727

(22) Filed: Aug. 28, 2017

Related U.S. Application Data

(62) Division of application No. 14/228,094, filed on Mar. 27, 2014, now Pat. No. 9,747,446.

(60) Provisional application No. 61/921,045, filed on Dec. 26, 2013.

(51) Int. Cl.
G06F 21/56 (2013.01)

(52) U.S. Cl.
CPC ............ G06F 21/566 (2013.01); G06F 21/56 (2013.01)

(58) Field of Classification Search
CPC ............................... G06F 21/566; G06F 21/56
See application file for complete search history.

(56) References Cited

U.S. PATENT DOCUMENTS

| 4,292,580 A | 9/1981 | Ott et al. |
|---|---|---|
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |

(Continued)

FOREIGN PATENT DOCUMENTS

| GB | 2439806 A | 1/2008 |
|---|---|---|
| GB | 2490431 A | 10/2012 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

Primary Examiner — Arvin Eskandarnia
(74) Attorney, Agent, or Firm — Rutan & Tucker, LLP

(57) ABSTRACT

One embodiment of the disclosure is directed to a method for generating an identifier for use in malware detection. Herein, a first plurality of indicators of compromise are obtained. These indicators of compromise correspond to a plurality of anomalous behaviors. Thereafter, a filtering operation is performed on the first plurality of indicators of compromise by removing one or more indicators of compromise from the first plurality of indicators of compromise to create a second plurality of indicators of compromise. The identifier represented by the second plurality of indicators of compromise is created.

34 Claims, 12 Drawing Sheets

(56) References Cited

U.S. PATENT DOCUMENTS

| | | |
|---|---|---|
| 6,108,799 A | 8/2000 | Boulay et al. |
| 6,118,382 A | 9/2000 | Hibbs et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,417,774 B1 | 7/2002 | Hibbs et al. |
| 6,424,627 B1 | 7/2002 | Sørhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,700,497 B2 | 3/2004 | Hibbs et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 6,995,665 B2 | 2/2006 | Appelt et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,079,085 B1 * | 12/2011 | Wu .................. G06F 21/55 713/188 |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |

(56) References Cited

U.S. PATENT DOCUMENTS

| | | |
|---|---|---|
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shifter et al. |
| 8,955,132 B2 * | 2/2015 | Turkulainen .......... G06F 9/455 713/188 |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,820 B1 * | 4/2015 | McDougal ............. G06F 21/56 726/22 |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,246 B1 * | 5/2016 | Wan ...................... G06F 21/566 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shifter et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |

(56) References Cited

U.S. PATENT DOCUMENTS

| | | |
|---|---|---|
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Shame et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Glide et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |

(56) References Cited

U.S. PATENT DOCUMENTS

| | | |
|---|---|---|
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1* | 10/2007 | Tuvell .................... G06F 21/56 726/24 |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler |
| 2008/0028463 A1 | 1/2008 | Dagon |
| 2008/0032556 A1 | 2/2008 | Schreier |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0181227 A1 | 7/2008 | Todd |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0183030 A1* | 7/2009 | Bethke ................ G06F 11/0709 714/37 |
| 2009/0187992 A1 | 7/2009 | Poston |
| 2009/0193293 A1 | 7/2009 | Stolfo et al. |
| 2009/0198651 A1 | 8/2009 | Shifter et al. |
| 2009/0198670 A1 | 8/2009 | Shifter et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |

(56) References Cited

U.S. PATENT DOCUMENTS

| | | |
|---|---|---|
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255000 A1* | 10/2012 | Sallam .................. G06F 21/566 726/23 |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shifter et al. |
| 2013/0318073 A1 | 11/2013 | Shiffer et al. |
| 2013/0325791 A1 | 12/2013 | Shifter et al. |
| 2013/0325792 A1 | 12/2013 | Shifter et al. |
| 2013/0325871 A1 | 12/2013 | Shifter et al. |
| 2013/0325872 A1 | 12/2013 | Shifter et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0082730 A1* | 3/2014 | Vashist ............... H04L 63/1416 726/23 |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shifter et al. |
| 2014/0189882 A1 | 7/2014 | Jung et al. |
| 2014/0201836 A1* | 7/2014 | Amsler ............... H04L 63/1425 726/23 |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1* | 12/2014 | Bu .......................... G06F 21/53 726/23 |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2011/112348 A1 | 9/2011 |
| WO | 2012/075336 A1 | 6/2012 |
| WO | 2012145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.iso?reload=true&arnumber=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlaq Berlin Heidelberg, (2006), pp. 165-184.

Baldi Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

(56) References Cited

OTHER PUBLICATIONS

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cisco, Configuring the Catalyst Switched Port Analyzer (SPAN) ("Cisco"), (1992).

Clark, John, Sylvian Leblanc,and Scott Knight. "Risks associated with usb hardware trojan devices used by insiders." Systems Conference (SysCon), 2011 IEEE International. IEEE, 2011.

Cohen, M.I., "PyFlag—An advanced network forensic framework", Digital investigation 5, Elsevier, (2008), pp. S112- S120.

Costa, M., et al., "Vigilante: End-to-End Containment of Internet Worms", SOSP '05, Association for Computing Machinery, Inc., Brighton U.K., (Oct. 23-26, 2005).

Crandall, J.R., et al., "Minos:Control Data Attack Prevention Orthogonal to Memory Model", 37th International Symposium on Microarchitecture, Portland, Oregon, (Dec. 2004).

Deutsch, P., "Zlib compressed data format specification version 13" RFC 1950, (1996).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W., et al., "ReVirt: Enabling Intrusion Analysis through Virtual-Machine Logging and Replay", Proceeding of the 5th Symposium on Operating Systems Design and Implementation, USENIX Association, "Dunlap"), (Dec. 9, 2002).

Excerpt regarding First Printing Date for Merike Kaeo, Designing Network Security ("Kaeo"), (2005).

Filiol, Eric, et al., "Combinatorial Optimisation of Worm Propagation on an Unknown Network", International Journal of computer Science 2.2 (2007).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Gibler, Clint, et al. AndroidLeaks: automatically detecting potential privacy leaks in android applications on a large scale. Springer Berlin Heidelberg, 2012.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-d/1035069? [retrieved on Jun. 1, 2016].

Heng Yin et al, Panorama: Capturing System-Wide Information Flow for Malware Detection and Analysis, Research Showcase © CMU, Carnegie Mellon University, 2007.

Hiroshi Shinotsuka, Malware Authors Using New Techniques to Evade Automated Threat Analysis Systems, Oct. 26, 2012, http://www.symantec.com/connect/blogs/, pp. 1-4.

Hjelmvik, Erik, "Passive Network Security Analysis with NetworkMiner", (IN)Secure, Issue 18, (Oct. 2008), pp. 1-100.

Idika et al., A-Survey-of-Malware-Detection-Techniques, Feb. 2, 2007, Department of Computer Science, Purdue Jniversity.

IEEE Xplore Digital Library Sear Results for "detection of unknown computer worms". Http/ieeexplore.ieee.org/searchresult.jsp?SortField=Score&SortOrder=desc- &ResultC . . . , (Accessed on Aug. 28, 2009).

Isohara, Takamasa, Keisuke Takemori, and Ayumu Kubota. "Kernel-based behavior analysis for android malware detection." Computational intelligence and Security (CIS), 2011 Seventh International Conference on. IEEE, 20111.

Kaeo, Merike, "Designing Network Security", ("Kaeo"), (Nov. 2003).

Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max, et al., Universal TUN/TAP driver, available at https://www.kernel.org/doc/Documentation/networking/tuntap.txt (2002) ("Krasnyansky").

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Leading Colleges Select FireEye to Stop Malware-Related Data Breaches, FireEye Inc., 2009.

Li et al., A VMM-Based System Call Interposition Framework for Program Monitoring, Dec. 2010, IEEE 16th International Conference on Parallel and Distributed Systems, pp. 706-711.

Liljenstam, Michael, et al., "Simulating Realistic Network Traffic for Worm Warning System Design and Testing", Institute for Security Technology studies, Dartmouth College ("Liljenstam"), (Oct. 27, 2003).

Lindorfer, Martina, Clemens Kolbitsch, and Paolo Milani Comparetti. "Detecting environment-sensitive malware." Recent Advances in Intrusion Detection. Springer Berlin Heidelberg, 2011.

Lok Kwong et al: "DroidScope: Seamlessly Reconstructing the OS and Dalvik Semantic Views for Dynamic Android Vlalware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

(56) References Cited

OTHER PUBLICATIONS

Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 14/228,094, filed Mar. 27, 2014 Notice of Allowance dated Apr. 21, 2017.
U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul, "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

* cited by examiner

SYSTEM AND METHOD FOR GENERATING A MALWARE IDENTIFIER

CROSS-REFERENCE TO RELATED APPLICATIONS

This application is a divisional of U.S. patent application Ser. No. 14/228,094 filed Mar. 27, 2014, now U.S. Pat. No. 9,747,446 issued on Aug. 29, 2017, which claims the benefit of priority on U.S. Provisional Application No. 61/921,045, filed Dec. 26, 2013, the entire contents of both of which are incorporated by reference herein.

1. Field

Embodiments of the disclosure relate to the field of data security. More specifically, one embodiment of the disclosure relates to a run-time classification of malicious objects, including advanced persistent threats (APTs).

2. General Background

Over the last decade, malicious software (malware) has become a pervasive problem for Internet users. In some situations, malware is a program or file that is embedded within downloadable content and designed to adversely influence or attack normal operations of a computer. Examples of different types of malware may include bots, computer viruses, worms, Trojan horses, spyware, adware, or any other programming that operates within an electronic device (e.g., computer, smartphone, server, router, wearable technology, or other types of electronics with data processing capabilities) without permission by the user or an administrator.

In general, an advanced persistent threat (APT) is malware that targets an entity and may be configured to exfiltrate (send out) information that is accessible to that entity. The targeted entity may include an individual or organization with high value information (e.g., classified or sensitive defense secrets, trade secrets, intellectual property, or the like). Currently, the classification of different types of malware, such as APTs for example, is quite resource intensive. For APTs, classification may require off-line system and workforce training.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

I. Overview

Figure 1:
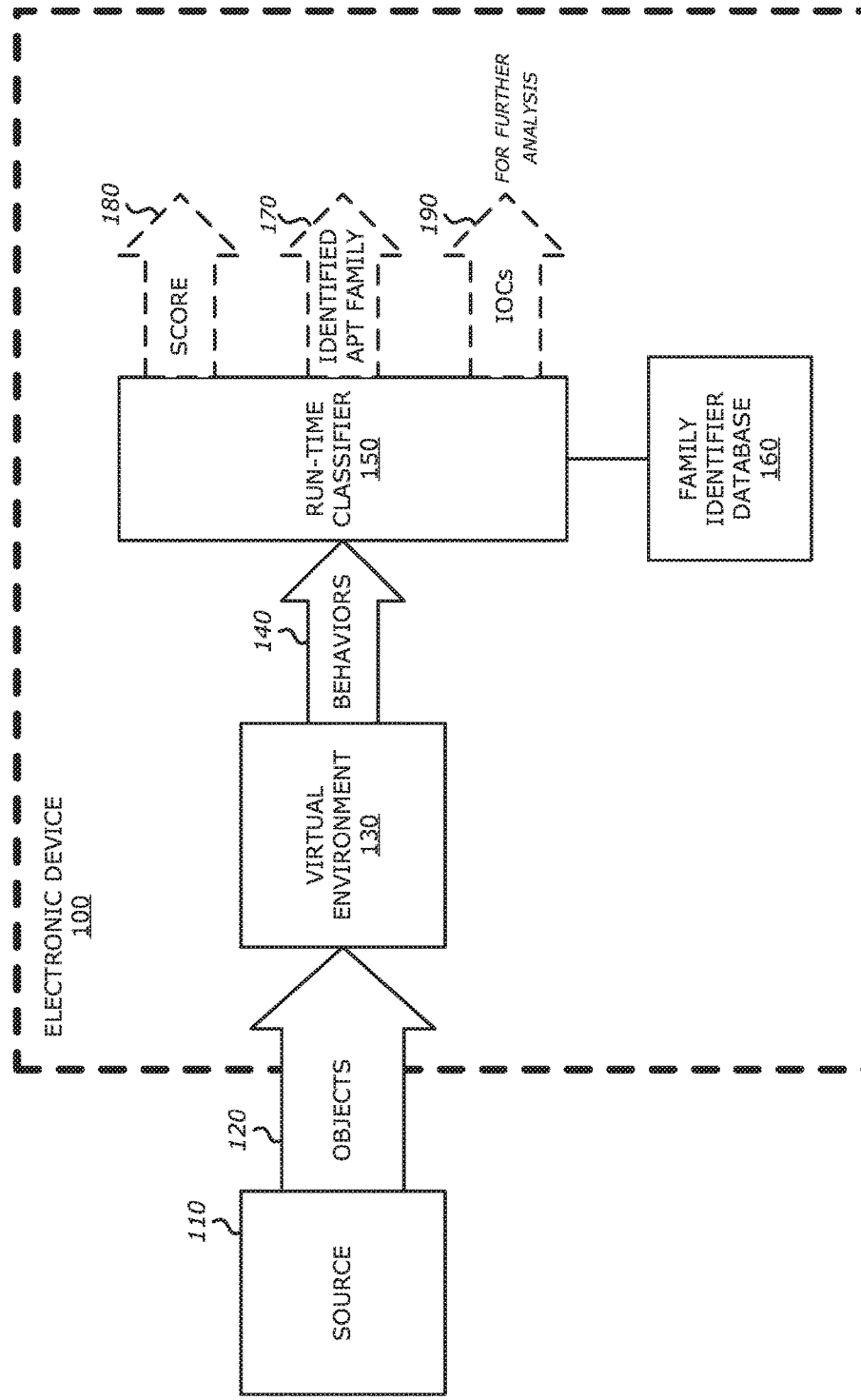
FIG. 1 is an exemplary block diagram of an operational flow of a run-time malware classification conducted within an electronic device.

Unlike conventional Advanced Persistent Threat (APT) detection systems, a first embodiment of the disclosure are directed to an APT detection system that is capable of automatically and quickly identifying a suspect object based on previously classified APT families in order to enable a network administrator or user to more easily understand the severity, origin, or tendencies of the recently detected APT.

A second embodiment of the disclosure is directed to a networked security appliance that is deployed with logic (e.g. run-time classifier) to accelerate detection of APT and non-APT malicious objects based on anomalous behaviors uncovered during virtual processing of the suspect object and anomalous behaviors that uniquely identify both known APT families and other malware type families.

As generally stated, an "APT" is a type of malware that is directed at a targeted entity and seeks to surveil, extract, and/or manipulate data to which the targeted entity would have access. In some instances, in lieu of data gathering, APTs may seek to perform nation state attacks for the purposes of political terrorism or cyber/industrial espionage. Hence, APTs are generally viewed as more serious threats because these attacks target a specific person or persons to acquire information (normally for nefarious reasons) and are persistent. Herein, a number of benefits may be realized through classification of APT and malware families for subsequent analysis, such as the following: (1) faster detection of APTs; (2) more accurate detection of APTs, including APTs that are morphing within a family; and/or (3) faster responsiveness to attacks that may be realized by reporting the names of recognized APT and other malware attacks.

More specifically, according to a first embodiment of the disclosure, an electronic device may be implemented with a run-time classifier, which is logic that is capable of accelerating the detection of malware, especially advanced persistent threats (APTs). The run-time classifier is configured to perform, during run-time (e.g., generally contemporaneously with virtual execution operations), an analysis based on (i) anomalous behaviors that are detected during virtual processing of a suspect object within a virtual execution environment and (ii) pre-stored family identifiers. A "family identifier" (also referred to as a "template") is a collection of data (samples) associated with anomalous behaviors that uniquely identify a particular (APT and/or non-APT) malware family. These anomalous behaviors may constitute (1) unexpected or undesired operations and/or (2) statistically significant usages/accesses of logical components (e.g., files, registry keys, etc.).

The framework for run-time APT analysis comprises one or more databases including family identifiers for APT families and/or malware (non-APT) families. Initially, it is contemplated that the database(s) may be pre-loaded with identifiers associated with currently known APT and non- APT malware families. Thereafter, the database(s) may be updated via one or more external sources and/or in real-time based on results of the APT analysis as described below.

More specifically, as stated above, each family identifier is a collection of data (samples) of anomalous behaviors that uniquely identify a given malware family, namely a collection of related APT malware (referred to as "APT family") and/or a collection of related malware other than APT malware (referred to as a "non-APT family". According to one embodiment of the disclosure, the samples of anomalous behaviors may be made generic by removal of the actual arguments (e.g., variable parameters) associated with these behaviors. Hence, this anomalous behavior data (referred to herein as common indicators of compromise "Common IOCs") may be selected based, at least in part, on the counts maintained for each type of anomalous behavior (IOC) that is associated with the malware forming an entire malware family, namely the related APTs forming a particular APT family or the related malware forming the non-APT family.

For instance, the Common IOCs may be a subset of all samples of anomalous behaviors (IOCs) associated with a particular APT family, where each Common IOC may be generally generated or selected based on (a) removal of actual arguments (parameter values) to make the IOCs generic, and/or (b) filtering out IOCs that would not provide sufficient distinction from other APT families. The filtering involves removing IOCs (1) with a low occurrence rate with the particular APT family (e.g., less than a first count threshold) and (2) with a high occurrence rate across other known APT families (e.g., greater than a second count threshold). The same technique may be used to generate Common IOCs (family identifiers) for non-APT malware. As a result, Common IOCs are a collection of anomalous behaviors (IOCs) that may be used to uniquely define a given malware family, namely an APT family or a non-APT family.

Stated differently, an APT family identifier for a first APT family, for example, may be generated by obtaining a count of each type of anomalous behavior (IOC) associated with the APTs forming the first APT family, where the count represents the number of occurrences for that anomalous behavior (e.g., IOC). This produces a set of IOCs (e.g., collection of samples of anomalous behaviors) where each IOC may be associated with one or likely more APTs within the first APT family.

Thereafter, the set of IOCs is filtered to remove (i) any IOC from the set of IOCs having a low occurrence rate within the first APT family (e.g., less than the first count threshold) and (ii) any IOC from the set of IOCs having a high occurrence rate across other APT families (e.g., greater than the second count threshold). The later condition ensures entropy among the different APT families to provide sufficient distinctiveness between the APT families. Thereafter, the remaining IOCs, which form a subset of the set of IOCs, are referred to as "Common IOCs" and are used as the "APT family identifier" for the first APT family. A similar process may be conducted to produce a "malware family identifier," namely a family identifier for a particular (non-APT) malware family.

According to one embodiment of the disclosure, when deployed within an APT detection system, a run-time classifier is configured to initially determine whether anomalous behaviors (IOCs) monitored during virtual processing of a received suspect object within a virtual execution environment statistically matches any (non-APT) malware family identifiers. In other words, the monitored IOCs are compared to the Common IOCs associated with every malware family identifier. Upon detecting a statistical match (e.g. IOCs match 90% or more of the Common IOCs), the analysis for confirming whether the suspect object is an APT is discontinued as the suspect object has now been identified as non-APT malware.

However, if no statistical match is detected, the monitored IOCs are compared with each of the APT family identifiers (e.g. Common IOCs representing each of the APT families). If a statistical match is detected for any of these APT family identifiers (e.g. IOCs match 90% or more of the Common IOCs for a previously classified APT family identifier), the suspect object is considered to be an APT that is part of that previously classified APT family. The family name and/or other stored information associated with the classified APT may be reported to the source submitting the suspect object and/or another electronic device (e.g., network administrator, etc.). This comparison of monitored IOCs with APT family identifiers is performed to provide faster detection of APT malware, as described below.

If no statistical match is detected again, a secondary analysis of the IOCs associated with the suspect object is performed in order to determine whether the suspect object may be classified as some unknown APT (that is not a member of a classified APT family) or malware that is not associated with a classified malware family. This secondary analysis is directed to analyzing the substantive nature of the anomalous behaviors to determine whether these behaviors constitute an APT. For instance, the secondary analysis may review anomalous behaviors involving data theft, statistically significant usages/access of certain logical components such as registry keys), or the like.

After the run-time classifier has completed its analysis, the results may be reported to a targeted destination (e.g., a user of the client device(s), network administrator, etc.) and/or stored in a database. The results may include an identifier for the APT family (hereinafter referred to as the "APT family identifier"), the name of the APT family, monitored behaviors characteristics of the APT family, or the like.

According to a second embodiment, APT family identifiers and/or malware family identifiers may be supplied to an electronic device (e.g., firewall, client device, a threat detection and prevention "TDP" system, etc.) for use in automated detection and prevention of future APT or other malicious attacks. When deployed within the electronic device, a run-time classifier is configured to determine whether anomalous behaviors (IOCs) monitored during virtual processing of a suspect object within a virtual execution environment of the electronic device statistically matches any pre-stored family identifiers such as APT or malware family identifiers. If so, the run-time classifier generates a measurement (referred to as a "score") and provides the score to a logic unit within the electronic device. The logic unit may use the score, in whole or in part, to determine and signify (to a user, administrator or other entity associated with the source of the suspect object) whether the suspect object is malicious or not. If malicious, based on the finding of the run-time classifier, a name associated with the potential APT or malware family to which the suspect object belongs may be provided.

As an illustrative example, the run-time classifier may be configured to generate a score whose value may be highly correlated to the type of family identifier detected. This score may contribute to the classification of the suspect object as malicious, where the amount of contribution may be based on the weighting applied to this score in determining whether a suspect object is malicious. For instance, the score from the run-time classifier may be aggregated with scores produced from other threat detection processes to produce an overall score that identifies if the suspect object appears to be benign or malware such as APT malware. Alternatively, the score may be utilized in a different manner to potentially influence the overall score.

For instance, when determining that the IOCs suggest that the suspect object is an APT, the run-time classifier may output a first score value. Depending on the weight assigned to scores provided by the run-time classifier (as compared to other scores provided by the other threat detection processes), the first score value may significantly (and perhaps definitely) cause the overall score to represent that the suspect object is malicious. While some embodiments may only use the first score value to signify (perhaps definitively) that the suspect object as malicious, other embodiments may use the first score value to signify (and perhaps definitively) that the suspect object is not only malicious but is an APT.

Also, when determining that the IOCs suggest that the suspect object is not any known malware family, the run-time classifier may output a second score value. Again, depending on the weight assigned, the second score value may have an impact in classifying the suspect object as benign or may have little impact on the classification of the suspect object as malicious.

It is contemplated that the scores output from the run-time classifier may be static for each type of family (e.g. each APT or malware family assigned the same score) or may vary between different types of families (APT, malware) as well as between different types of malware families, between different types of APT families, and between different malware or APTs within their corresponding malware or APT families.

In accordance with another specific implementation, IOCs are stored within a run-time log (e.g., maintained by behavior monitoring logic) of behaviors detected (monitored) during virtual processing of a suspect object within a virtual execution environment and are made generic (prior to storage or thereafter) by removal of actual arguments (parameter values). These monitored behaviors may be used to generate a template (CIOC) as described above. In one embodiment, the logged behaviors may be time-stamped so as to preserve their chronological order during processing and the CIOC is generated to reflect the processing sequence of the CIOC.

II. Terminology

In the following description, certain terminology is used to describe features of the invention. For example, in certain situations, both terms "logic" and "engine" are representative of hardware, firmware and/or software that is configured to perform one or more functions. As hardware, logic (or engine) may include circuitry having data processing or storage functionality. Examples of such circuitry may include, but is not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Logic (or engine) may be software in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "object" generally refers to a collection of data, whether in transit (e.g., over a network) or at rest (e.g., stored), often having a logical structure or organization that enables it to be classified for purposes of analysis. The objects may be associated with network traffic. During analysis, for example, the object may exhibit a set of expected characteristics and, during processing, a set of expected behaviors. The object may also exhibit a set of unexpected characteristics and a set of unexpected behaviors that may evidence malware and allow the object to be classified as at least "malicious" and perhaps classified as an advanced persistent threat (APT), when warranted.

Examples of objects may include one or more flows or a self-contained element within a flow itself. A "flow" generally refers to related packets that are received, transmitted, or exchanged within a communication session. For convenience, a packet broadly refers to a series of bits or bytes having a prescribed format, which may include packets, frames, or cells. A "message" may be broadly referred to as any series of bits or bytes having a prescribed format as well.

As an illustrative example, an object may include a set of flows such as (1) a sequence of transmissions in accordance with a particular communication protocol (e.g., User Datagram Protocol (UDP); Transmission Control Protocol (TCP); or Hypertext Transfer Protocol (HTTP); etc.), or (2) inter-process communications (e.g., Remote Procedure Call "RPC" or analogous processes, etc.). Similar, as another illustrative example, the object may be a self-contained element, where different types of such objects may include an executable file, non-executable file (such as a document or a dynamically link library), a Portable Document Format (PDF) file, a JavaScript file, Zip file, a Flash file, a document (for example, a Microsoft Office® document), an electronic mail (email), downloaded web page, an instant messaging element in accordance with Session Initiation Protocol (SIP) or another messaging protocol, or the like.

As noted above, an APT is a type of sophisticated network attack that is directed at a particular target and seeks to surveil, extract, and/or manipulate data to which a targeted entity would have access. APTs may seek to maintain a persistent attack on a targeted electronic device and may initially lay dormant (prior to activation) for a prolonged period of time in comparison with traditional malware.

For example, a self-contained element of a flow, such as an APT-latent email message for example, may be specifically directed to a particular individual at a company (e.g., an officer of the company) in an attempt to extract sensitive data accessible by that individual. Sometimes, the APT-latent email message may include text/greetings that are personalized for the targeted entity along with an attachment (e.g., a Portable Document Format (PDF) document). The attachment may contain malicious content such that, upon opening or otherwise activating the attachment, the malicious content attempts to extract and/or manipulate targeted data accessible to the defined target.

Malware may be construed broadly as software that, upon execution, is designed to take advantage of a vulnerability, for example, to harm or co-opt operation of an electronic device or misappropriate, modify or delete data as for APT malware. Conventionally, malware is often said to be designed with malicious intent. An object may constitute or contain malware, whether APT malware or non-APT malware.

The term "transmission medium" is a physical or logical communication path between two or more electronic devices (e.g., any devices with data processing and network connectivity such as, for example, a security appliance, a server, a mainframe, a computer such as a desktop or laptop, netbook, tablet, firewall, smart phone, router, switch, bridge, etc.). For instance, the communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

In general, a "virtual machine" (VM) is a simulation of an electronic device (abstract or real) that is usually different from the electronic device conducting the simulation. A VM may be used to provide a sandbox or safe runtime environment to enable detection of APTs and/or other types of malware in a safe environment. The VM may be based on specifications of a hypothetical computer or emulate the computer architecture and functions of a real world computer.

The term "computerized" generally represents that any corresponding operations are conducted by hardware in combination with software and/or firmware. Also, the term "compare" or "comparison" generally means determining if a statistical match (e.g., a certain level of correlation) is achieved between two items where one of the items may include a particular family identifier, as described below in detail.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." The phrase "(A, B, . . . , etc.)" has a similar connotation. An exception to this definition will occur only when a combination of elements, functions, steps or acts are in some way inherently mutually exclusive.

The invention may be utilized for detection, verification and/or prioritization of malicious content such as exploits. As this invention is susceptible to embodiments of many different forms, it is intended that the present disclosure is to be considered as an example of the principles of the invention and not intended to limit the invention to the specific embodiments shown and described.

III. General Operation Flow of Run-Time Malware Classification

Referring to FIG. 1, an exemplary block diagram of an operational flow of a run-time malware classification conducted within an electronic device 100 is shown. Herein, incoming objects 120 originally associated with network traffic are uploaded into a virtual environment 130. Herein, the virtual environment 130 comprises virtual execution logic including one or more virtual machines that virtually process (also referred to as "detonate") each of the incoming objects 120. The virtual environment 130 further monitors behaviors during such virtual processing. Some or all of these monitored behaviors 140 are provided to a run-time classifier 150 for analysis in real-time. For this embodiment, only anomalous behaviors, namely unexpected or undesired operations by the suspect object and/or statistically significant usages/access of certain logical components (e.g., registry keys, certain ports or files, etc.), are provided to the run-time classifier 150. Of course, all monitored behaviors may be provided to the run-time classifier 150, which would be provided functionality for identifying the anomalous behaviors from normal behaviors.

According to one embodiment of the disclosure, the run-time classifier 150 is configured to initially determine whether the anomalous behaviors 140 (sometimes referred to as "indicators of compromise" or "IOCs), being part of the monitored behaviors during virtual processing of an object, statistically match one of a plurality of preconfigured family identifiers stored in database 160. For this embodiment, a family identifier may be either (i) an APT family identifier directed to a particular APT family or (ii) a malware family identifier directed to a non-APT malware family.

Herein, according to one embodiment of the disclosure, the family identifier database 160 may follow a relational, object, hierarchical, or any other type of database model. In one embodiment, the family identifier database 160 is spread across one or more persistent data stores. The persistent data stores may be integrated within the electronic device 100 (e.g., APT detection system 200 or TDP system $910_1$ described below) or within a separate host electronic device. For example, the family identifier database 160 may be located at a remote or even geographically remote location that is communicatively coupled (e.g., by a dedicated communication link or a network) to the electronic device 100.

As stated above, each family identifier is a collection of samples of anomalous behaviors, also referred to herein as common indicators of compromise ("Common IOCs"). The Common IOCs may be selected based, at least in part, on the counts maintained for each type of anomalous behavior (IOC) that is associated with the APTs (or malware) forming a particular family (e.g., APT family, malware family, etc.).

Therefore, if the IOCs associated with the suspect object statistically match any Common IOCs corresponding to the family identifiers, the run-time classifier 150 determines that the suspect object is part of that particular (APT or malware) family. Depending on the deployment for the run-time classifier, a number of actions may be undertaken by the electronic device when the IOCs statistically match any Common IOCs representing a family identifier. For instance, as an example, the particulars associated with the uncovered family may be reported, as represented by output 170. As another example, further analysis in determining whether the suspect object is an APT may be discontinued or may be continued to obtain further analytical information. As yet another example, a score associated with the uncovered family may be provided to logic within the electronic device that is responsible for deciding whether the incoming suspect object is malicious or not, as represented by output 180. The determination logic can rely solely on the determination or weigh other considerations when making the decision.

If no statistical match is detected, a secondary analysis of the IOCs associated with the suspect object may be performed to determine whether the suspect object still may be classified as an APT (e.g., the suspect object is an APT that does not belong to any classified APT or malware families, as represented by output 190.

Hence, the run-time classifier 150 is useful to more quickly detect APTs and other types of non-APT malware. This may enable network administrators to address malicious attacks before serious security issues may arise.

IV. APT Detection System Deployment of Run-Time Classifier

Figure 2:
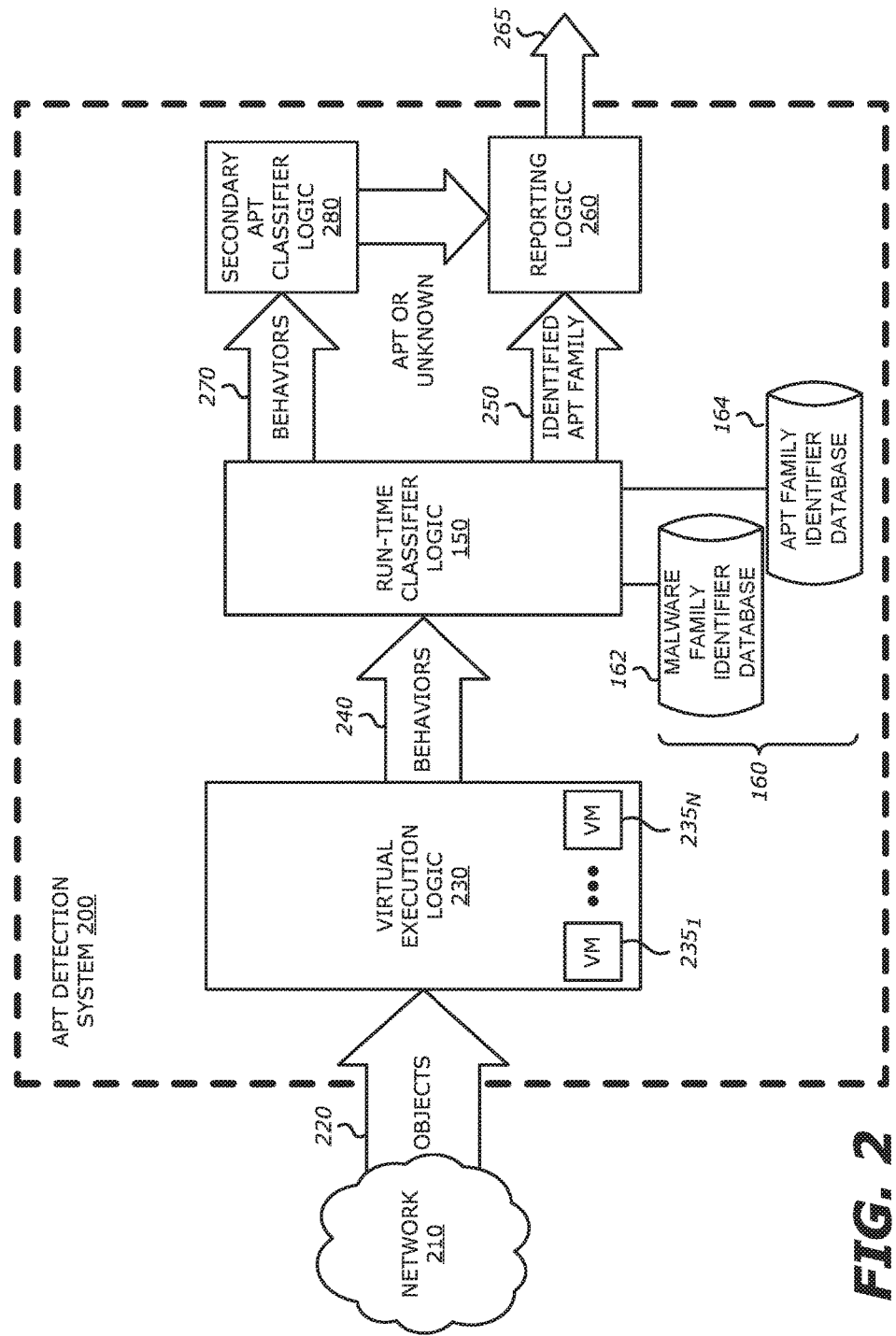
FIG. 2 is an exemplary block diagram of a first illustrative embodiment of an APT detection system that is adapted to perform run-time APT classification on incoming objects.
Figure 3:
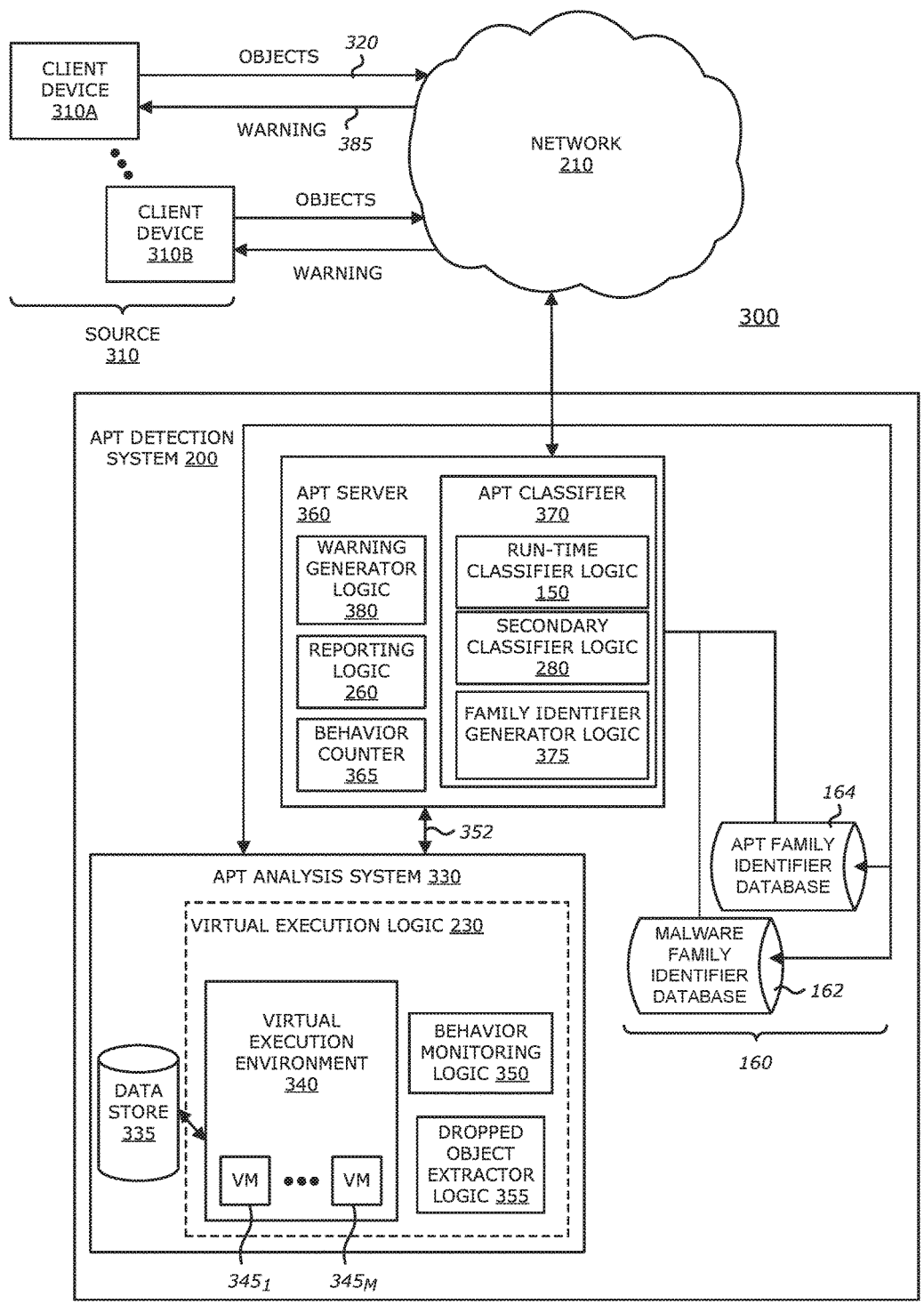
FIG. 3 is an exemplary block diagram of an illustrative embodiment of a communication system deploying run-time APT classification.

Referring to FIG. 2, an exemplary block diagram of a first illustrative embodiment of an APT detection system 200 that is adapted to perform run-time APT classification on incoming objects 220 is shown. Received from a source via network 210, the incoming objects 220 are directed to virtual execution logic 230, which is part of the APT analysis system 330 as shown in FIG. 3.

Herein, the incoming objects 220 may be captured and filtered from some or all of the incoming objects associated with network traffic. For instance, as an illustrative example, before receipt of an incoming object (e.g., one of incoming objects 220) by virtual execution logic 230, it is contemplated that intrusion protection system (IPS) logic or heuristic logic (not shown) may be deployed to filter incoming objects 220 from a larger set of objects (not shown). Such filtering may be conducted through signature checks or other static analysis processes, where the incoming objects 220 are tagged for more in-depth analysis. Given that the source (not shown) may be an electronic device that has already determined that some or all of the incoming objects 220 may be malicious, the operations of the IPS logic and/or heuristic logic may be suspended or the amount of filtering realized may be de minimis. In fact, for some deployments, the IPS/heuristic logic is unnecessary and may not be implemented.

Herein, the virtual execution logic 230 comprises one or more virtual machines $235_1$-$235_N$ (N≥1), which virtually processes (sometimes referred to as "detonate") each of the incoming objects 220 and monitors for anomalous behaviors during such virtual processing, as described below. These anomalous behaviors 240 are provided to the run-time classifier 150 for analysis.

According to one embodiment of the disclosure, the run-time classifier 150 is configured to initially determine whether the anomalous behaviors 240 (IOCs) statistically match any malware family identifiers. According to this embodiment of the disclosure, the malware family identifiers may be retrieved from malware family identifier database 162, which along with an APT family identifier database 164 forms the family identifier database 160. Family identifier database 160 may be located within the APT detection system 200 or may be located at remote or even geographically remote location that is communicatively coupled (e.g., by a dedicated communication link or via network 210) to the APT detection system 200 (e.g., cloud services; dedicated external server; etc.). Both the malware family identifiers and the APT family identifiers may be updated in a periodic or aperiodic manner, based on data downloaded from an external server (not shown) or data from suspect objects 220 detected as APTs or other malware by run-time classifier 150.

As stated above, each family identifier is a collection of data (samples) associated with anomalous behaviors that uniquely identify a given APT (or malware) family. This collection of anomalous behavior data (Common IOCs) may be selected based, at least in part, on the counts maintained for each type of anomalous behavior that is associated with the APTs (or malware) forming a particular APT (or malware) family. For instance, the Common IOCs (S1, S2, S4, S8 and S18) representing a first APT family identifier for a first APT family may be a subset of samples S1-S20 of anomalous behaviors for the first APT family. Each Common IOC (S1, S2, S4, S8 and S18) may be selected based on (1) a high occurrence rate of an IOC (e.g., greater than a first count threshold) for the first APT family and (2) a lower occurrence rate of this behavior (e.g., less than a second count threshold) across other APT families stored in APT family identifier database 164. Similarly, the Common IOCs (S3-S4, S10 and S28) representing a second APT family identifier may be a subset of samples (S1-S5, S10-S12 and S21-S30) of anomalous behaviors for the second APT family. It is noted that some Common IOCs may be shared between different APT family identifiers, provided that the Common IOCs in their entirety are collectively distinct and unique.

Therefore, if the IOCs associated with the suspect object statistically match any of the malware family identifiers retrieved from malware family identifier database 162, the run-time classifier 150 determines that the suspect object is not an APT and discontinues its analysis.

If no statistical match is detected, the monitored IOCs from the suspect object are compared with each of the APT family identifiers retrieved from APT family identifier database 164. If a statistical match is detected, the suspect object is considered to be an APT that is part of a previously classified APT family. Information 250 associated with the classified APT family (e.g., family name, suspect object, Common IOCs used, etc.) may be received by reporting logic 260 and forwarded to the source submitting the object or to another electronic device (e.g., administrator, etc.), as denoted by flow 265.

If no statistical match is detected, a secondary analysis of the IOCs associated with the suspect object may be performed by a secondary classifier 280 that receives at least the anomalous behaviors 270 to determine whether the suspect object may be classified as an APT or not. This secondary analysis may involve substantive review for anomalous behaviors directed to data theft, statistically significant usages/access of certain logical components such as registry keys, or the like. Hence, the run-time APT analysis is used prior to this analysis to achieve faster detection of APTs associated with APT families that have already been classified, as further described below.

Referring now to FIG. 3, an exemplary block diagram of an illustrative embodiment of a communication system 300 is shown, where a source 310 may upload suspect objects to the APT detection system 200 for analysis as to whether each of these suspect objects is an APT. Herein, the communication system 300 comprises APT detection system 200 communicatively coupled to the source 310 over transmission medium forming the network 210. In general, according to one embodiment of the disclosure, the APT detection system 200 comprises one or more electronic devices that are configured to receive one or more suspect objects 320 from the source 310 (e.g., client devices 310A and 310B) for APT detection and potential APT family classification.

More specifically, according to this embodiment, the APT detection system 200 comprises an APT analysis system 330, an APT server 360, and the family identifier database 160. In particular, the APT server 360 operates in combination with the family identifier database 160 and/or APT analysis system 330 to automatically determine whether an incoming suspect object 320 is an APT belonging to a previously classified APT family.

According to one embodiment of the disclosure, the suspect object 320 is provided to the APT analysis system 330, in particular the virtual execution logic 230 within the APT analysis system 330. The virtual execution logic 230 comprises a run-time virtual execution environment 340 that comprises one or more virtual machines (VMs) $345_1$-$345_M$ (M≥1), where one or more of the VMs $345_1$-$345_M$ may be configured for virtual processing the suspect object 320 which may cause anomalous behaviors to occur.

Although not shown, VMs $345_1$-$345_M$ may be configured based on the results of the signature checks conducted prior to routing the subject object 320 to the APT analysis system 330. Alternatively, metadata associated with the subject object 320 may be used, at least in part, to determine protocols, application types and other information that may be used to determine particular software profile(s). The software profile(s) are used for selecting corresponding software images within a data store 335 for use in configuring a run-time environment in the one or more virtual machines $345_1$-$345_M$. These software profile(s) may be directed to different versions of the same software application for fetching corresponding software image(s) from data store 370.

During virtual execution of the subject object by one or more of the VMs $345_1$-$345_M$, the behaviors exhibited during virtual processing are monitored by a behavior monitoring logic 350. Of these monitored behaviors, a count may be maintained by behavior counter 365 (deployed in APT analysis system 330 or APT server 360 as shown) for at least each type of monitored anomalous behavior 352. The anomalous behaviors 352 are provided from APT analysis system 330 to the run-time classifier 150 of the APT server 360. The dropped object extractor 355 performs operations to detect, extract, and pass dropped objects during virtual processing by the suspect object 320 by VM(s) and/or $345_M$.

As illustrated in FIG. 3, the APT server 360 comprises the behavior counter 365, an APT classifier 370, a warning generator 380, and reporting logic 260. Herein the APT classifier 370 includes the run-time classifier 150, secondary classifier 280 and family identifier generator 375. While run-time classifier 150 and secondary classifier 280 are configured to attempt to classify suspect objects 320 as APTs based on an analysis relying on family identifiers, the family identifier generator 375 is configured to generate such family identifiers.

Figure 4:
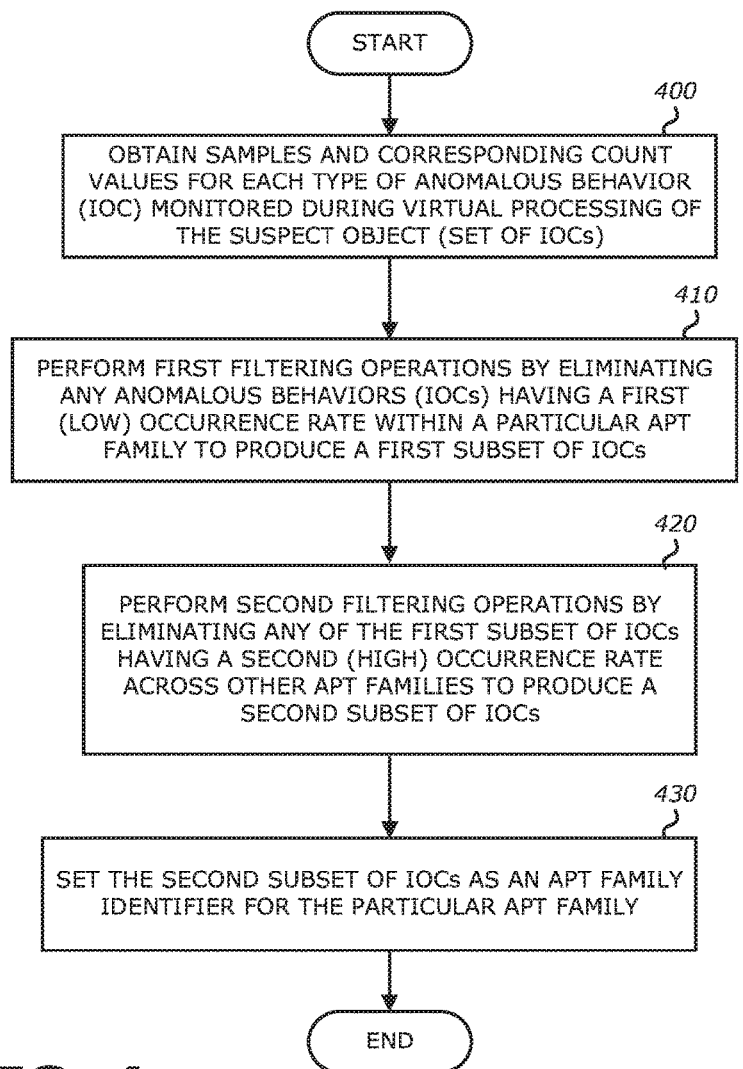
FIG. 4 is an illustrative embodiment of operations conducted by family identifier generator logic to generate a family identifier, such as an APT family identifier.

Referring to FIG. 4, in accordance with formulation of the framework for conducting the run-time APT analysis using the family databases, an illustrative embodiment of operations conducted by the family identifier generator 375 to generate a family identifier, such as an APT family identifier for example, is shown. Initially, the family filter generator obtains samples of all types of anomalous behaviors (IOCs) associated with the APTs forming a particular APT family along with their corresponding counts (operation 400). These IOCs may be referred to as a set of IOCs. Upon obtaining the set of IOCs, the family filter generator performs a first filtering operation by eliminating any IOC that falls below a first occurrence rate within the particular APT family to produce a first subset of IOCs (operation 410). The first occurrence rate may represent a first count threshold, which may be a static value or a dynamic value.

Thereafter, the family filter generator performs a second filtering operation on the first subset of IOCs by eliminating any IOC having a second occurrence rate within APT families other than the particular APT family (operation 420). The second filter operation produces a second subset of IOCs. Herein, the second occurrence rate may represent a second count threshold, which may be greater (and perhaps substantially greater by a few factors) than the first count threshold. Similarly, the second count threshold may be a static value or a dynamic value. Of course, it is contemplated that the second filtering operation may be conducted prior to the first filtering operation as the ordering of these operations may be changed providing both filtering operations are performed.

After performing the first and second filtering operations, the second subset of IOCS may constitute the Common IOCs that represent the APT family identifier for the particular APT family (operation 430). Of course, based on the number of IOCs forming the second subset of IOCs, it is contemplated that only some of the second subset of IOCs may be used as the APT family identifier.

Referring back to FIG. 3, after receipt of the anomalous behaviors 352 (e.g., IOCs) associated with the suspect object 320 from APT analysis system 330, the run-time classifier 150 within the APT server 360 determines if the suspect object corresponds to any malware family identifiers (e.g. corresponds to a predetermined percentage of CIOCs forming the malware family identifier), which may be obtained from the malware family identifier database 162. In general, this determination involves a statistical comparison of the IOCs associated with the suspect object 320 to the malware family identifiers within the malware family identifier database 162. Upon determining that the IOCs associated with the suspect object 320 statistically match any of the malware family identifiers, the run-time classifier 150 discontinues analysis on the suspect object 320 as it has been classified other than an APT. For instance, a "statistical match" may be a determination that ninety percent (90%) or more of the IOCs match the compared Common IOCs as described above.

Upon failing to detect a statistical match between the IOCs associated with the subject object 320 and the malware family identifiers, the run-time classifier 150 analyzes these IOCs in connection with the APT family identifiers, which may be retrieved from APT family identifier database 164. Upon comparing the IOCs with some or all of APT family identifiers and detecting a statistical match, the run-time classifier 150 has identified the suspect object 320 as an APT that is part of the classified APT family. It is contemplated that, for testing purposes, the suspect object 320 may be an APT from a known APT family in order to better define APT family boundaries.

In response to detecting that object 320 is an APT of a classified APT family, the warning generator 380 of the APT server 360 generates and transmits a warning message 385 to the source 310 (e.g., a corresponding client device 310A). The warning message 385 may indicate to a targeted recipient (e.g., client, IT personnel, etc.) that the suspect object 320 is an APT, perhaps along with its determined APT family name; the APT family identifier for use in detecting future attacks, namely the Common IOCs representing the APT family (e.g., anomalous behaviors such as data theft, statistically significant usages/access of certain logical components such as registry keys); or the like. Alternatively, the warning message 385 may be routed to another electronic device (e.g., administrator, etc.).

If no statistical match is still detected by run-time classifier 150, a secondary classifier 280 is now provided with the IOCs associated with the subject object 320 and analyzes the substantive nature of these IOCs to determine whether the suspect object may be classified as an APT or not.

Referring still to FIG. 3, one or more client devices 310A and 310B are coupled to the APT detection system 200 through the network 210. Network 210 may be a private network (e.g., enterprise network) in which both the APT detection system 110 and the client devices 310A and 310B are on the same network. Alternatively, network 210 may be a public network in which the APT detection system 200 is remotely accessed by an electronic device (e.g., client 310A/310B, etc.).

Herein, the client device(s) 310A/310B may be any type of electronic device, including laptop computers, desktop computers, tablet computers, smartphones, servers, network devices (e.g., firewalls and routers), wearable technology, process controllers, or other types of electronics with data processing capabilities and typically have network connectivity. Furthermore, the client device(s) 310A/310B may include one or more processors with corresponding memory units for processing data. The processors and memory units are generally used herein to refer to any suitable combination of programmable data processing components and data storage that conduct the operations needed to implement the various functions and operations of the client device(s) 120. The processors may be special purpose processors such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory units may refer to non-volatile memory. An operating system may be stored in the memory units of the client device(s) 310A/310B, along with application programs specific to the various functions of the client device(s) 310A/310B, which are to be run or executed by the processors to perform the various functions of the client device(s) 310A/310B. For example, the memory units of a client device 310A/310B may store email and/or web-browser applications that are run by associated processors to send, receive, and view information associated with the objects.

Figure 5:
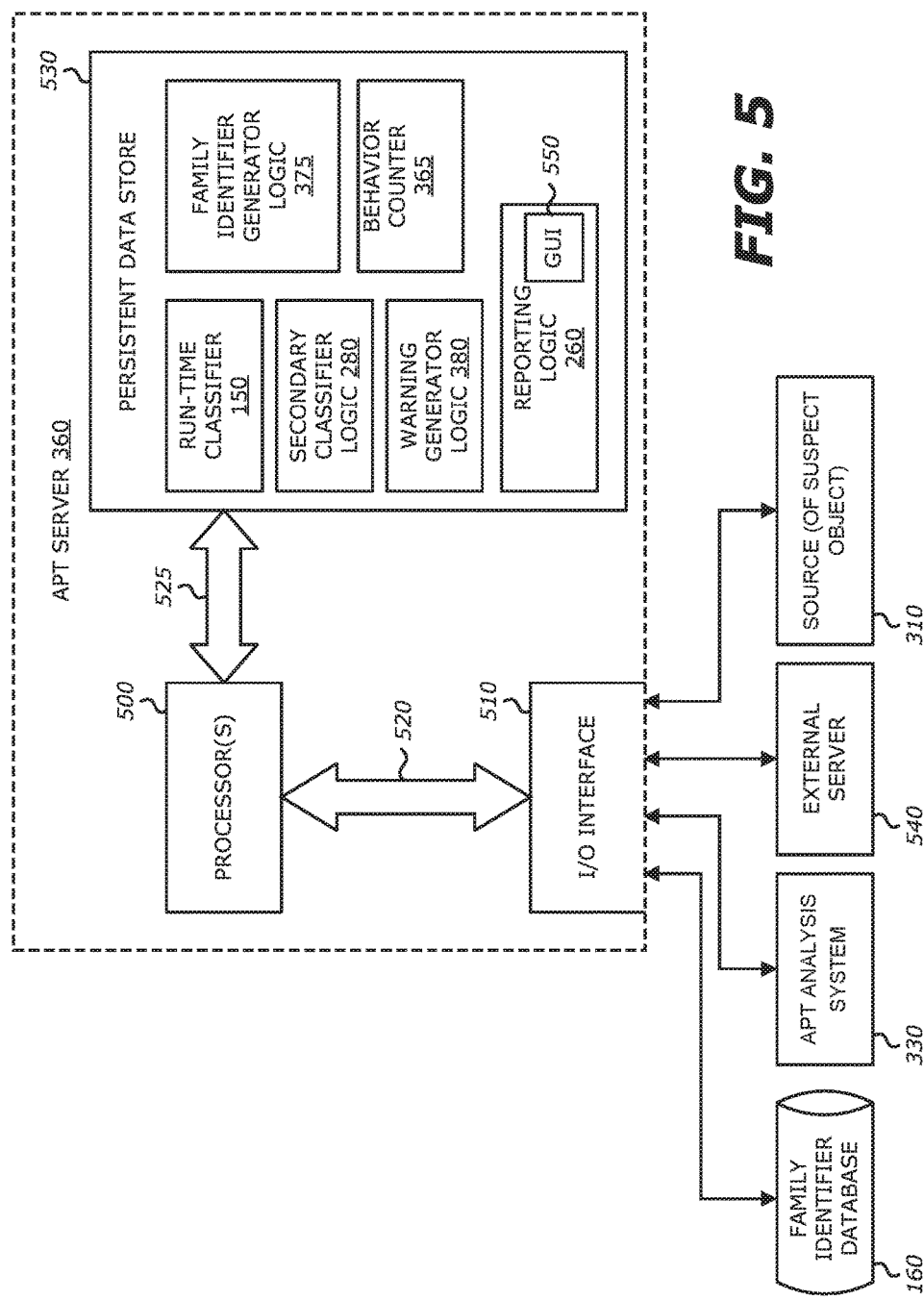
FIG. 5 is a detailed exemplary of a component diagram of the APT server according to one embodiment of the invention.

FIG. 5 shows a component diagram of the APT server 360 according to one embodiment of the invention. As shown, the APT server 360 may include one or more processors 500 and a persistent data store 530, where processor(s) 500 is further coupled to persistent storage 530 via transmission medium 525.

The one or more processors 500 and the persistent data store 530 are generally used herein to refer to any suitable combination of programmable data processing components and data storage that conduct the operations needed to implement the various functions and operations of the APT server 360. The processor(s) 500 may be one or more special purpose processors such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the persistent data store 530 may refer to non-volatile memory. An operating system may be stored in the persistent data store 530, along with application programs specific to the run-time classifier 150 and other various functions of the APT server 360, which are to be run or executed by the processors 500 to perform the various functions of the APT server 360.

In one embodiment, the APT server 360 may include one or more input/output (I/O) interfaces 510 for communicating with various components external to the APT server 360. The I/O interface(s) 510 may be implemented as a physical interface including one or more ports for wired connectors. Additionally, or in the alternative, I/O interface 510 may be implemented with one or more radio units for supporting wireless communications with other electronic devices. Hence, the I/O interface(s) 510 enables communications with one or more electronic devices using wireless and/or wired protocols, including the IEEE 802.3 and the IEEE 802.11 suite of standards.

In one embodiment, as shown in FIG. 5, the I/O interface(s) 510 allows the APT server 360 to communicate with the family identifier database 160, an external server 540, APT analysis system 330, and/or the source 310 for suspect objects over one or more wired and/or wireless transmission mediums. It is contemplated that the APT analysis system 330 may be optional where the virtual processing of the suspect object occurs outside the APT detection system 200, and anomalous behaviors are provided to APT server 360 from other resources (including remote sources).

Referring still to FIG. 5, the persistent data store 530 may store logic, including the run-time classifier 150, the secondary classifier 280, the warning generator 380 and reporting logic 260 (e.g., a graphical user interface "GUI"). Each of these logic elements may be discrete software components that may be processed/run by one or more of the processors 500. Each element stored in the persistent data store 530 and shown in FIG. 5 will be described below in accordance with the method of operation described in FIGS. 6A-6B.

Figure 6A:
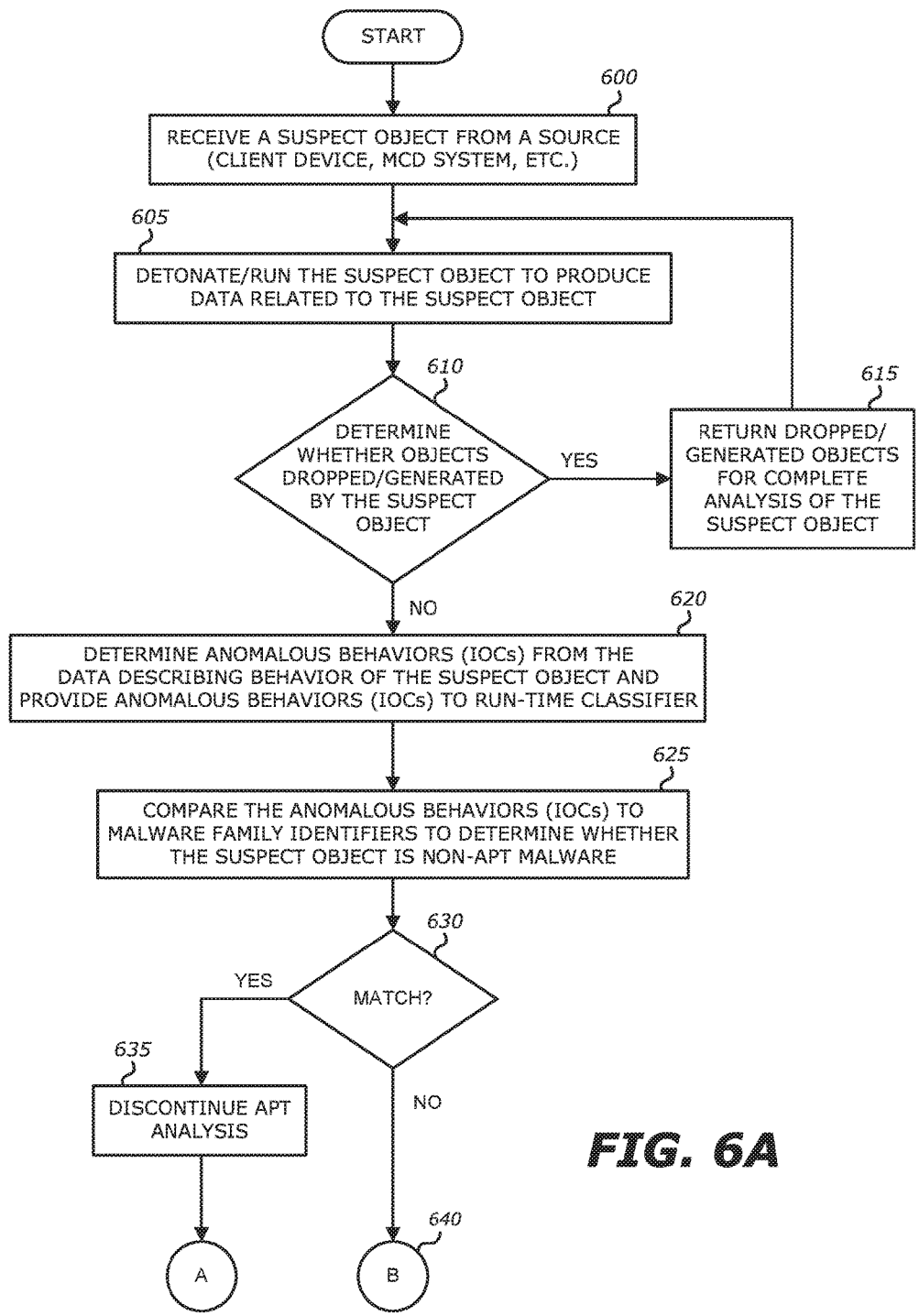
FIGS. 6A-6B are illustrative embodiments a method for identifying and classifying APT objects.

Referring to both FIGS. 5-6A, an illustrative embodiment of a method for identifying and classifying APT objects is shown. Herein, at operation 500, a suspect object is received by the APT detection system 200, namely the virtual execution logic within the APT analysis system 330 receives the suspect object 320 from the source 310 (e.g., client device 310A, a threat detection and prevention "TDP" system of FIG. 9, etc.). It is contemplated that, where the source 310 is a TDP system which also analyzes the suspect object for malware, the suspect object is provided directly to the APT detection system 200 to verify whether the suspect object includes APT malware. However, where the source 310 is the client device 310A, it may utilize the APT detection system 200 as a primary malware detection system, and thus, APT server 360 may include graphics user interface (GUI) logic 550 that allow a user of the client device 310A to submit a suspect object through an interface. The interface may be generated by the GUI logic 550 and served to the client device 310A. In this fashion, the APT server 330 may operate as a web-server to deliver data and provide a user interface to the client device 310A.

Figure 7A:
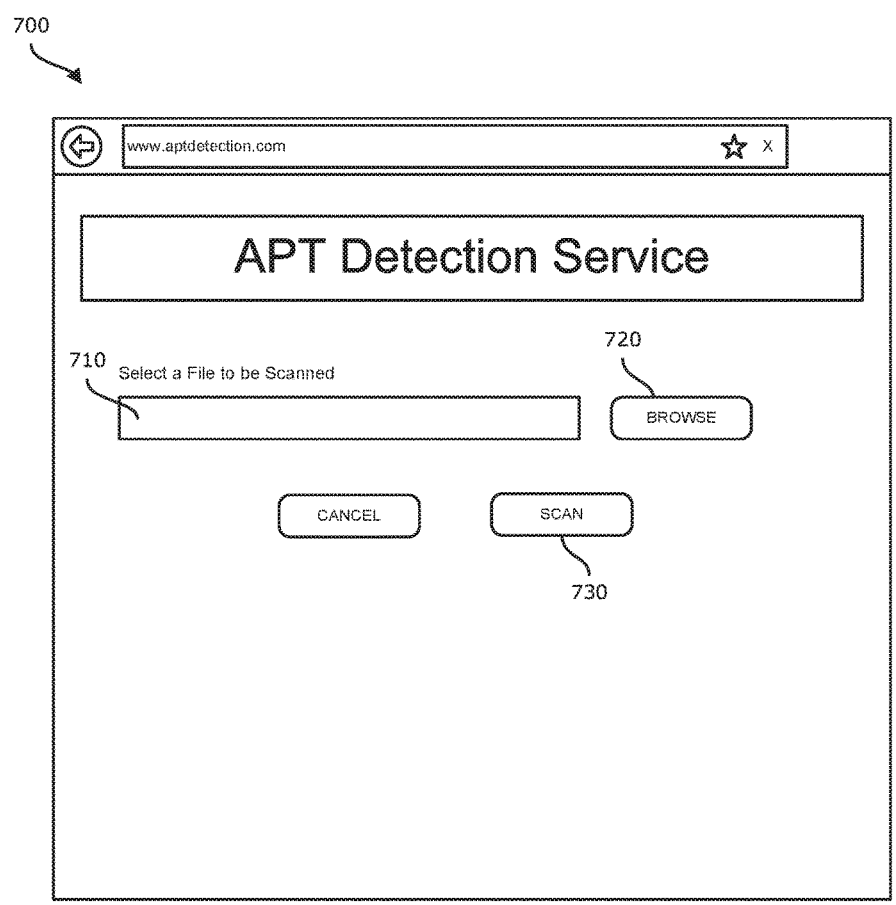
FIGS. 7A-7B are exemplary web-interfaces for submitting a suspected object to the APT server from the client device and receipt of a warning message.

Referring to FIG. 7A, an exemplary web-interface 700 for submitting a suspected object to the APT server 360 from client device 310A is shown. In this example interface, a user may direct a web browser running on the client device 310A to view the web-interface 700. The user may thereinafter enter the address/location of a suspect object into the web-interface 700 using the address input field 710 and the "BROWSE" button 720. The entered address indicates the location of the suspect object in storage on the client device 310A or on a remote device (e.g., stored on a server). After selection of the suspect object, the user may submit the suspect object to the APT server 360 by selecting the "SCAN" button 730 in the web-interface 700. The suspect object may be transmitted from the client device 310A such that it is received by the APT server 360 for processing as described above at operation 600.

Although the APT server 360 is described above to serve the web-interface 700 to a browser of the client device 310A, in other embodiments, a separate web-server may be in communication with the client device 310A and the APT server 360 to provide the web-interface 700 and facilitate transmission of the suspect object to the APT server 360 from the client device 310A.

Referring back to FIGS. 5-6A, following receipt of the suspect object, APT analysis system 330 detonates the suspect object (e.g., processes by virtual execution or other operations to activate the suspect object) to produce data describing the anomalous behaviors of the suspect object during virtual processing (operation 605). In one embodiment, the APT analysis system 330 comprises one or more separate computing devices or processing units that may independently and discretely process the suspect object and monitor (e.g., log, count, etc.) the resultant operations.

For example, in one embodiment, the suspect object may be a self-contained element of a flow such as a PDF file. In this embodiment, APT analysis system 330 may configure a VM with Adobe® Reader® or other appropriate document reader to detonate the PDF file (e.g., performs virtual operations on the PDF file). The resultant behaviors performed during virtual processing of the suspect object are monitored by behavior monitoring logic 375, and a count (number of occurrences) for each type of monitored, anomalous behavior may be maintained. Each of these counts may include the number of occurrences of a particular anomalous behavior during virtual processing of the suspect object and/or associated dropped objects (hereinafter referred to as "behavior count value").

After detonating the suspect object, the APT analysis system 330 monitors and records at least the anomalous behaviors and their aggregated behavior count values. This recorded data describing the suspect object. Use of the APT analysis system 330 ensures that detonation of the suspect object is controlled and will not result in infection of the client device 310A and/or the compromise of sensitive data. According to one embodiment, the APT analysis system 330 conducts heuristic analysis.

According to another embodiment, the APT analysis system 330 includes a plurality of VMs with various profiles, and may, in some cases, simulate the client device 310A during detonation of the suspect object. These profiles may include software to be run by a VM to process a suspect object. For example, the profiles may include an operating system and one or more suitable computer applications that are required to process the objects. In this example, one of the applications may include a document reader (e.g., an Adobe® Reader for PDF documents) and/or a web browser (for web pages) for detonating the suspect object. The APT analysis system 330 may include separate virtual processors and memory units for use in detonating different types of objects.

As noted above, detonation of the suspect object at operation 305 produces data that describes anomalous behaviors of the suspect object. Of course, besides data directed to the anomalous behaviors and their corresponding count values, the data may also include details regarding the origin of the suspect object stored in metadata, data generated by the suspect object during detonation, data attempted to be accessed by the suspect object (both locally and from remote systems) during detonation, etc.

During detonation, in some cases, the suspect object may generate/drop separate objects during detonation. These dropped objects may be new files (e.g., binary files) or other segments of data or executable code created by the original suspect object. In this embodiment, the dropped objects may be uncovered and passed back to operation 605 for detonation by the dropped object extractor (operations 610 and 615). Accordingly, each of the dropped objects is detonated in a similar fashion as described in relation to the suspect object to generate data associated with each dropped object and behavior count values for behaviors detected during analysis of the original suspect object may be augmented to reflect the actual number of occurrences for each particular behavior.

As shown in operation 620, after detonation of the suspect object and any dropped objects produced by the suspect object, anomalous behaviors associated with the suspect and dropped objects may be determined from the data. Additionally, the behavior count values may be tallied or, in the alternative, determined by the run-time classifier 150 in lieu of the APT analysis system 330 performing the behavior count analysis.

As an illustrative example, monitored anomalous behaviors of the objects during detonation along with the number of occurrences of these particular behaviors (behavior count value) are maintained. For instance, a first behavior count value associated with a first anomalous behavior may represent the number of occurrences that a suspect object attempts to make out-bound communications to outside data sources during virtual processing of that object. Outbound communications may seek instructions, for example from a malicious server, as to conduct malicious activity. In another embodiment, a second behavior count value associated with a second anomalous behavior may represent the number of occurrences that a suspect object is attempting to exfiltrate (or send out) data to an external resource. In fact, exfiltration of data alone may indicate that the object is an APT.

Hence, the anomalous behaviors provide a comprehensive description of an associated object such that a comparison of anomalous behaviors, and analysis of their corresponding count values may be performed. Such comparison/analysis is conducted to determine whether the object is an APT and/or belongs to a particular APT family, as described below.

Optionally, data related to the suspect object and the dropped objects may be further retrieved from external data sources while anomalous behaviors are being monitored during virtual processing of the suspect object. For example, data may be retrieved from the external server 540 through the I/O interface 510. In this embodiment, the external server 540 may be a device on the same local area network as the APT detection system 200 or connected to the APT detection system 200 over a wide area network (e.g., the Internet). For example, as discussed above, the external server 540 may be connected to the APT detection system 200 through the network 210 of FIG. 3.

In one embodiment, the data retrieved from the external server 540 may include data related to servers attempted to be accessed by the suspect and dropped objects while being detonated (e.g., internet protocol (IP) address of a server) where APT analysis system 200 physically processes the object in lieu of logical (virtual) processing. In another embodiment, the external data may include data collected by third parties related to the suspect object (e.g., malware classification information). In one embodiment, operation 620 may be performed by the run-time classifier 150.

Following generation of behaviors for the suspect object and/or the dropped objects, as shown in operation 625, the APT classifier 250 may analyze the data to automatically (1) determine whether the suspect object belongs to a known malware (non-APT) family. If not, the APT classifier 250 may determine (i) whether the suspect object is an APT belonging to a previously classified APT family, or (2) whether the suspect object is an APT where a family associated with the suspect object has not been classified.

More specifically, as shown in FIG. 6A, the run-time classifier 150 performs an analysis of the anomalous behaviors (IOCs) associated with the suspect object to any or all of the malware family identifiers (block 525). This analysis may involve statistical comparison of the IOCs associated with the suspect object to the Common IOCs formulating each of the malware family identifiers. If a statistical match is detected, the run-time classifier discontinues further processing of the suspect object as the object is now determined to be malware other than an APT (operations 630 and 635). However, it is contemplated that the analytic data may be generated and reported. Otherwise, if no statistical match is detected, the run-time classifier continues further analysis (operation 640).

Figure 6B:
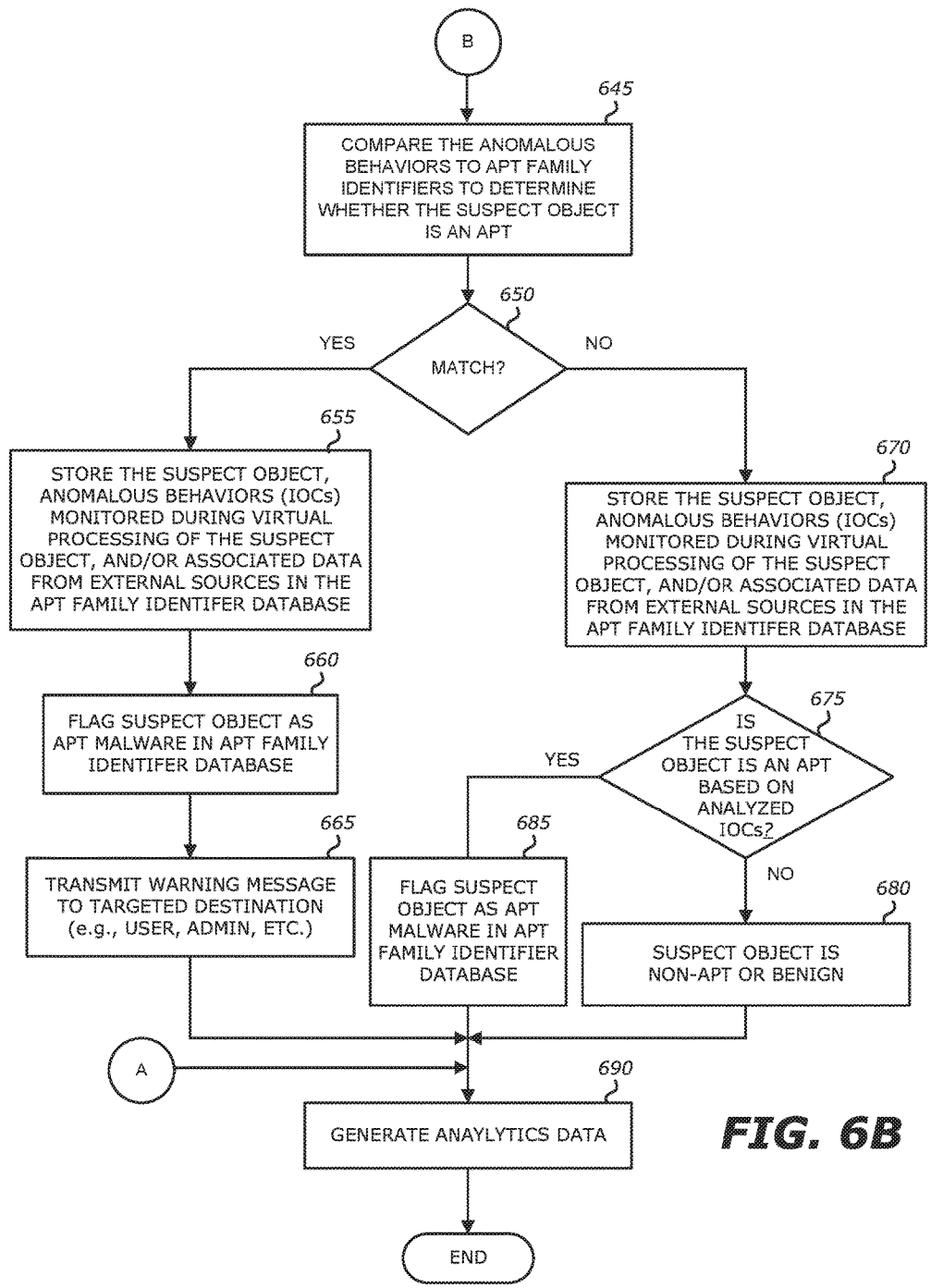

Referring now to FIG. 6B, after conducting a first analysis by statistically comparing the IOCs of the suspect object to the Common IOCs associated with the malware family identifiers, the run-time classifier conducts a second analysis by comparing the IOCs of the suspect object to the Common IOCs associated with previously classified APT families as retrieved from the family identifier database (operation 645). If a statistical match is detected, the object is an APT and is classified as belonging to that APT family (blocks 650 and 655).

In one embodiment, each entry in the APT family identifier database 164 may include the suspect object along with the APT family identifier that uniquely identifies the object in the APT family identifier database. Other information that may be stored within APT family identifier database 164 may include one or more of the monitored anomalous behaviors (e.g., IOCs) for the suspect object, data from external server or other resources, or the like (operation 655).

Upon determining that the suspect object is APT malware and storage of its behaviors (IOCs), the suspect object is flagged as APT malware in the APT family identifier database (operation 660). In one embodiment, flagging the suspect object as APT malware includes setting an APT malware data value associated with the suspect object in the APT family identifier database 164 to a selected value, e.g., "true". Also, the APT family identifier is stored to identify that the APT malware belongs to a certain APT family from which information associated with the APT family can be accessed for inclusion within the warning message or subsequently accessed by the user or administrator using the APT family identifier.

After flagging the suspect object as APT malware in the APT family identifier database, the warning generator within the APT server generates a warning message to a targeted destination such as a source of the suspect object (e.g., client device 310A or TDP system) or another electronic device (operation 665). The warning message identifies that the suspect object is APT malware and should be discarded, deleted, quarantined or otherwise avoided.

By the warning generator 389 transmitting a warning message or other messages to the source identifying a classification of the suspect object, a user or administrator of the source may be better prepared and less susceptible to APTs and other malicious attacks. For example, upon receiving a warning message from the APT detection system 200 of FIG. 3, the user may delete/quarantine the suspect object(s) (e.g., an email or file) and/or report the suspect object(s) to a network administrator. Also, the APT detection system 200 may generate the APT family identifier for the APT malware including its metadata, such as, for example, its behaviors observed during processing. The APT family identifiers may be stored in the APT family identifier database 162 and may be distributed to one or more other electronic devices. The APT family identifier (or parts thereof) may be used to generate a signature for the APT malware, which may be used in turn by the source or other electronic devices to block future objects/content where signature statistically matches are found. This proactive action may prevent the source from being infected by the suspect object and sensitive data accessible to the user is not compromised by the suspect object.

Figure 7B:
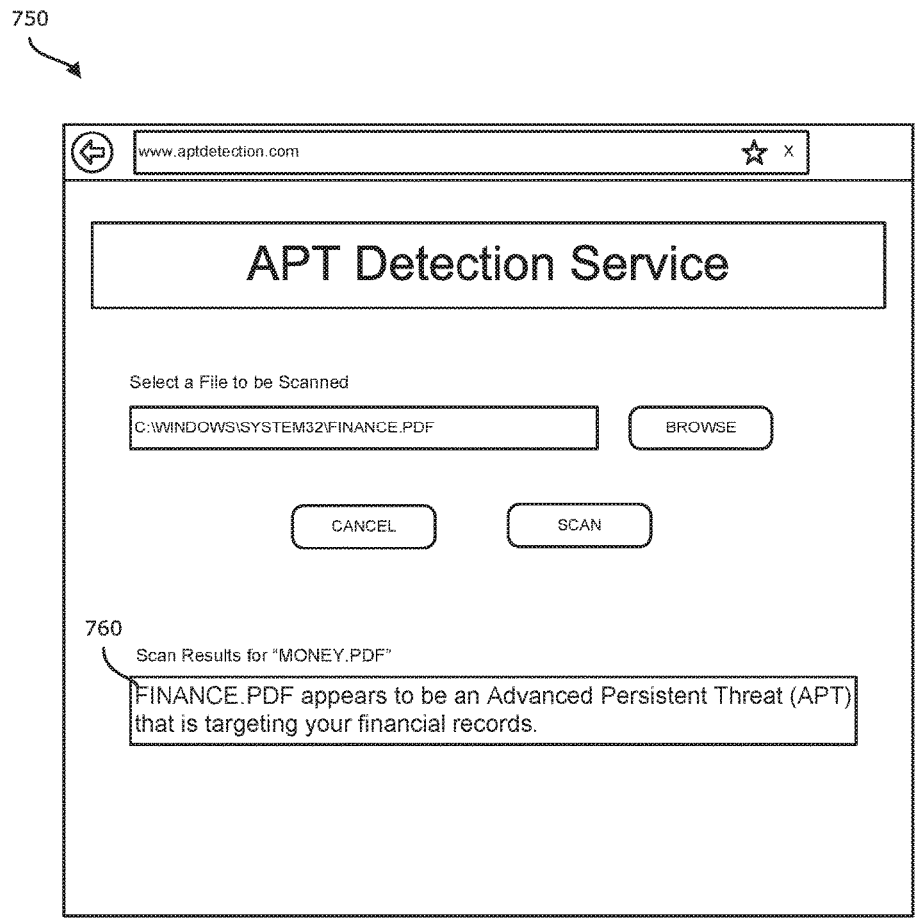

In one embodiment, the warning message may be a transmission to a component of the web-interface 700. For example, as shown in FIG. 7B, a dialog box 750 of the web-interface 700 may be updated to indicate that the suspect object is APT malware. In other embodiments, other warnings may be transmitted to the client device 310A. For example, email messages, pop-up messages, or other signals may be transmitted between the APT detection system 200 and the client device 310A to represent the warning message.

Similarly, upon determining at operation 650 that the suspect object is not APT malware, the run-time classifier stores the suspect object, some or all of the anomalous behaviors (IOCs) associated with the suspect object, and/or data from external sources into the APT family identifier database 164 (operation 670). Thereafter, the secondary classifier is configured to determine whether the suspect object is APT malware or non-APT malware based on comparisons with anomalous behaviors of the suspect object to highly common anomalous behaviors (operation 675). This comparison may be performed using machine learning and statistical analysis.

Upon determining that the suspect object is non-APT malware, the secondary classifier 280 flags the suspect object as non-APT malware (operation 685). In one embodiment, flagging the suspect object as non-APT malware includes setting an APT malware data value associated with the suspect object temporarily stored the APT family identifier database 164 to a selected value, e.g., "false". However, upon determining that the suspect object is new APT malware, the suspect object is flagged as APT malware in the APT family identifier database 164 (operation 685), where the APT may be assigned to a new APT family identifier or assigned to a "known" classification for now. Thereafter, the analytic data has been generated (operation 690).

Figure 8:
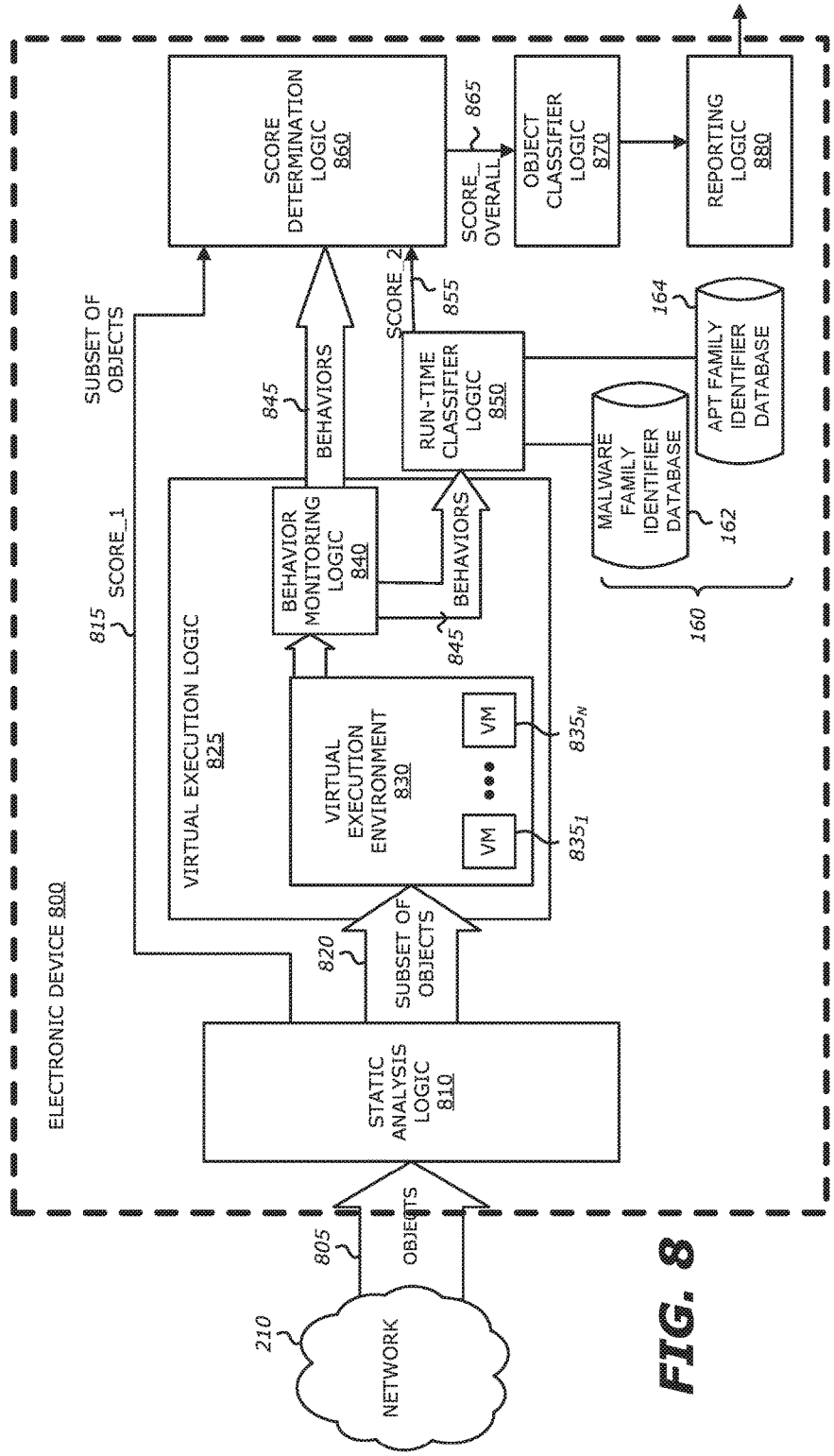
FIG. 8 is an exemplary block diagram of a second illustrative embodiment of an electronic device that is adapted to perform run-time APT classification on incoming objects.

V. Threat Detection and Protection System (TDP) System Deployment of Run-Time Classifier Although described above as transmission of a suspect object, in other embodiments, a suspect object may be analyzed separate from the APT detection system 200, where the monitored APT detection functionality deployed within an electronic device (e.g., firewall, client device, a threat detection and prevention "TDP" system, etc.). According to a second embodiment of the disclosure, as shown in FIG. 8, the electronic device 800 may be adapted to receive the APT family identifiers and/or malware family identifiers for use in automated detection and prevention of future APT or other malicious attacks at the appliance level.

In contrast to deployment within the APT detection system, when deployed within the electronic device 800, a run-time classifier 850 may be configured to determine whether anomalous behaviors (IOCs) monitored during virtual processing of a suspect object within a virtual execution environment statistically matches any pre-stored APT or malware family identifiers within family identifier database 160. If so, the run-time classifier 850 generates a measurement (referred to as a "score") that is provided to the score determination logic 860 within the electronic device. The score determination logic 860 may use the score, in whole or in part, in determining whether the suspect object is to be classified malicious or not.

As an illustrative example, received from a source via network 210, incoming objects 805 are captured and subsequently analyzed by static analysis logic 810 to (i) filter a subset of the objects 820 from the incoming objects 805 and/or (ii) generate a score (Score_1) 815 associated with each object that reflects the likelihood of the object being malware (and perhaps the severity of the potential malware).

In particular, as an illustrative example, before receipt of objects 820 by virtual execution logic 825, the static analysis logic 810 (e.g., IPS logic, heuristic logic) may conduct signature checks (e.g., exploit signature checks, vulnerability signature checks, etc.) or other scanning operations on the objects 805, where a subset of objects 820 are tagged for more in-depth analysis. Furthermore, the static analysis logic 810 may be configured to generate a score (Score_1) 815 for each analyzed object, which represents the probability (or level of confidence) that the characteristics of that analyzed object are indicative of malware. In other words, the score represents a value that classifies the threat level of the possible malware characterized by the particular analyzed object.

For instance, as an illustrative example, upon detecting one type of characteristic that suggests an object 820 under analysis is malware, the static analysis logic 810 may generate a score having a first value (e.g., score of 5 out of 20) associated with that object. However, upon detecting multiple characteristics or another type of characteristic that more strongly suggests the object under analysis is malware, a higher score (e.g., score of 13 out of 20) may be generated.

Herein, the virtual execution logic 825 comprises a run-time virtual execution environment 830 that features one or more virtual machines $835_1$-$835_N$ (N≥1), which virtually processes (sometimes referred to as "detonate") each of the incoming objects 820. Behavior monitoring logic 840 monitors the behaviors produced during virtual processing of a suspect object 820 and determines which the these behaviors are anomalous. These anomalous behaviors 845 are provided to the run-time classifier 850 for analysis.

The run-time classifier 850 may be configured to generate a score (Score_2) 855 whose value may be dependent on whether the suspect object is classified to be part of a known malware (non-APT or APT) family and/or the type of malware family. Score_2 855 may contribute to the classification of the suspect object as malicious, where the amount of contribution may be based on the weighting applied to Score_2 855. For instance, Score_2 855 may be aggregated with scores produced from other threat detection processes (e.g., Score_1 produced by static analysis logic 810) or may be utilized in a different manner to influence the overall score used to identify whether the suspect object is malicious or not. The score determination logic 860 generates the overall score 865 to an object classifier 870 that identifies to reporting logic 880 within electronic device 800 if the suspect object appears to be benign, non-APT malware or APT malware.

For instance, when determining that the anomalous behaviors (IOCs) 845 suggest that the suspect object is an APT, the run-time classifier 850 may output a first score value. Depending on the weight assigned to scores provided by the run-time classifier 850 (as compared to other scores produced by analysis of the anomalous behaviors received from behavior monitoring logic 840 by score determination logic 860 and Score_1 provided by static analysis logic 810), the output first score value may significantly (and perhaps definitely) cause the overall score produced by score determination logic 860 to represent that the suspect object as malicious. Similarly, when determining that the IOCs suggest that the suspect object does not belong to any malware or APT family, the run-time classifier 850 may output a second score value less than the first score value. Again, depending on the weight assigned, the second score value may have little or no impact in assisting the score determination logic 860 to classify the suspect object as malicious.

According to one embodiment, it is contemplated that Score_2 output from the run-time classifier 150 may be based on the particular APT or malware family to which the suspect object belongs, where each classified malware and APT family is assigned as particular score value. Of course, it is contemplated that the score values simply may vary between types of families (APT, malware, etc.).

Figure 9:
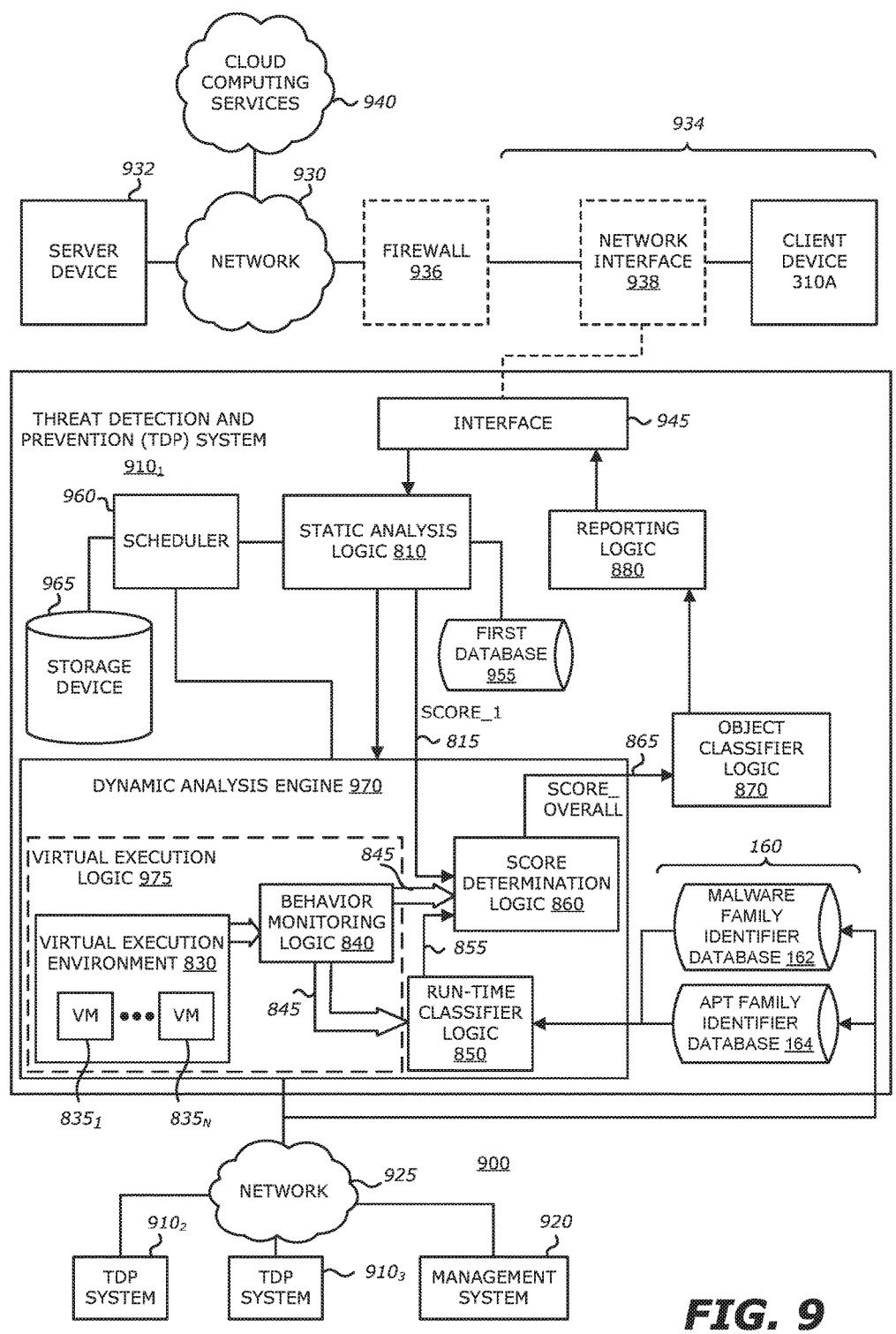
FIG. 9 is an illustrative embodiment of a communication system implemented with the electronic device FIG. 8 with run-time APT classification functionality.

Referring now to FIG. 9, an exemplary block diagram of An illustrative embodiment of the communication system 900 implemented with electronic device 800 of FIG. 8 operating as a threat detection and prevention (TDP) system is shown. Herein, the communication system 900 comprises one or more TDP systems (e.g. TDP systems $910_1$-$910_3$) coupled to management system 920 through a network 925. Herein, the management system 920 may be adapted to upload information associated with recently uncovered APTs and other malware into the TDP systems $910_1$-$910_3$, such as newly updated malware family identifiers and APT family identifiers to database 160.

As shown, the TDP system $910_1$ is adapted to analyze one or more objects associated with network traffic that may have originated from server device 932 via local network 930 and is now propagating over an enterprise network 934. The TDP system $910_1$ is shown as being coupled with the local network 930, normally behind a firewall 936, via a network interface 938. The network interface 938 operates as a data capturing device (referred to as a "tap" or "network tap") that is configured to receive network traffic propagating to/from the client device(s) 310A and provide object(s) from the network traffic to the TDP system $910_1$.

In general, the network interface 938 is configured to receive and route one or more objects that are received from or targeted to client device 310A, normally without an appreciable decline in network performance. According to one embodiment of the disclosure, the network interface 938 may simply re-route an object for analysis to the TDP system $910_1$ or, in another embodiment, duplicate the object and provide the same to the TDP system $910_1$. For instance, the network interface 938 may duplicate one or more files that are part of a data flow or part of the payload contained within certain data packets, metadata, or the like.

It is contemplated that, for any embodiments where the TDP system $910_1$ is implemented as an dedicated appliance or a dedicated computer system, the network interface 938 may include an assembly integrated into the appliance or computer system that includes network ports, network interface card and related logic (not shown) for connecting to the local network 930 to non-disruptively "tap" network traffic by providing at least a portion or a copy of the network traffic to TDP system $910_1$. In other embodiments, the network interface 938 can be integrated into an intermediary device in the communication path (e.g., firewall, router, switch or other network device) or can be a standalone component.

Alternatively, the TDP system $910_1$ may be deployed as an inline security appliance (not shown), which analyzes intercepted objects for malware or other indicators of suspicious content. Upon suspecting a presence of malware in an object under analysis, the suspect object may be forwarded to the dynamic analysis engine 970 for further analysis as described below.

More specifically, as shown in FIG. 9, the TDP system $910_1$ comprises an I/O interface 945, static analysis logic 810, a first database 950 (along with family identifier database 160), a scheduler 960, a storage device 965, a dynamic analysis engine 970, object classifier 870 and reporting logic 880. In some embodiments, the network interface 938 may be contained within the TDP system $910_1$ and operates as I/O interface 945. Also, the static analysis logic 810, the scheduler 960 and/or the dynamic analysis engine 970 may be software modules, which are executed by one or more processors (or different processors) and are configured to receive and analyze content within one or more received objects. After analysis, the potential APT objects (or TDP-detected features) are output from reporting logic 995 to client device 310A via I/O interface 945 and network interface 938.

In one embodiment, the static analysis logic 810 may serve as a filter to permit subsequent malware analysis only on a portion of incoming data, which effectively conserves system resources and provides faster response time in determining the presence of malware within the analyzed object (s). As shown in FIG. 9, the static analysis logic 810 is configured to receive incoming objects from the network interface 938 and applies heuristics to determine if any of the objects is "suspicious". The heuristics applied by the static analysis logic 810 may be based on signature checks and/or rules stored in the database 955. Some of these rules may include APT-centric rules to uncover objects having certain traits common for APT malware (e.g., one or more unexpected attempts to exfiltrate data, etc.). Also, the static analysis logic 810 may examine the image of the object without executing or opening the object.

For example, the static analysis logic 810 may examine the metadata or attributes of the object under analysis (e.g., portion of an email message, file, document, a binary image of an executable, etc.) to determine whether a certain portion of the object statistically matches (e.g., a prescribed level of correlation with) a predetermined pattern of attributes that is associated with a malicious attack such as an APT attack. According to one embodiment of the disclosure, the static analysis logic 810 tags certain suspect objects within the network traffic as suspicious and supplies a score (Score_1 815) to score determination logic 860 for use in generating an overall score 865 for signaling to object classifier 870 as to whether the suspect object is malicious or not.

Thereafter, according to one embodiment of the invention, the static analysis logic 810 may be adapted to transmit the suspect objects to the dynamic analysis engine 970 and perhaps at least a portion of the metadata of the suspect objects to scheduler 960. The portion of the metadata may identify attributes of the runtime environment in which the suspect object should be processed and, on occasion, attributes of the client device(s) 310A to which the suspect object was targeted. Such metadata or attributes are used to identify a configuration of the VM needed for subsequent malware analysis. As an alternative embodiment, the dynamic analysis engine 970 may be adapted to receive one or more messages (e.g., data packets) from the static analysis logic 810 and analyze the message(s) to identify the software profile information associated with the needed VM and obtain such needed information.

As an illustrative example, a suspicious (suspect) object may constitute an email message that was generated, under control of Windows® 7 Operating System, using a Windows® Outlook 2010, version 1. Upon determining that the email message includes an attachment for example, static analysis logic 810 provides software profile information to the scheduler 960 to identify a particular configuration of VM needed to conduct dynamic analysis of the suspect object and its self-contained elements such as the attachment. According to this illustrative example, the software profile information would include (1) Windows® 7 Operating System (OS); (2) Windows® Outlook 2000, version 1; and perhaps an Adobe® reader if the attachment is a PDF document.

The static analysis logic 810 supplies the software profile information to the scheduler 960, which determines whether any of the VM disk files within storage device 965 feature a software profile supporting the above-identified configuration of OS and one or more applications or a suitable alternative.

The dynamic analysis engine 970 is adapted to execute one or more VMs $835_1$-$835_N$, to simulate the receipt and execution of content associated with an object under analysis within a run-time virtual execution environment 830 as expected by the type of object. Furthermore, the behavior monitoring logic 840 within the dynamic analysis engine 970 may be configured to (i) monitor behaviors of the content being analyzed by one or more VMs $835_1$, . . . , and/or $835_N$, (ii) detect anomalous behaviors 845 associated with the monitored behaviors, and (iii) provide these anomalous behaviors 845 to both score determination logic 860 and run-time classifier 850. The run-time classifier 850 determines, through analysis of the anomalous behaviors (IOCs) and family identifiers (Common IOCs) as to whether there is a statistical match. If so, a score associated with the matched family identifier (Score_2 855) is provided to score determination logic 860.

Thereafter, based in part on Score_1 815, Score_2 855, and the results produced from analysis of the anomalous behaviors 845, the score determination logic 860 route the results (e.g., overall score 865, information associated with the detected anomalous behaviors, and other information associated with the detected malicious activity by the suspect object) to the object classifier 870.

According to one embodiment of the disclosure, the score determination logic 860 comprises one or more software modules that are used to determine a probability (or level of confidence) that the suspect object is malware. Score determination logic 860 is configured to generate the overall score 865 that classifies the threat of the possible malware. Of course, the overall score 865 may be based on a combination of different analysis results.

For instance, according to one embodiment, the overall score 865 may be an aggregation of a score independently generated by the score determination logic 860 along with Score_1 815 and Score_2 855. Alternatively, the overall score 865 may be an aggregation of these scores, with Score_2 855 being weighted more than Score_1 815. As another alternative, the overall score 865 may be weighted heavily on Score_2 855. In yet another embodiment, the overall score 865 may be based on a weighing primarily relying on the score produced by the score determination logic 860 separate and apart from Score_1 815 and Score_2 845, which may be used to assist in the analysis when the score produced by the score determination logic 860 is borderline as to whether the suspect object is malicious or not.

Figure 10:
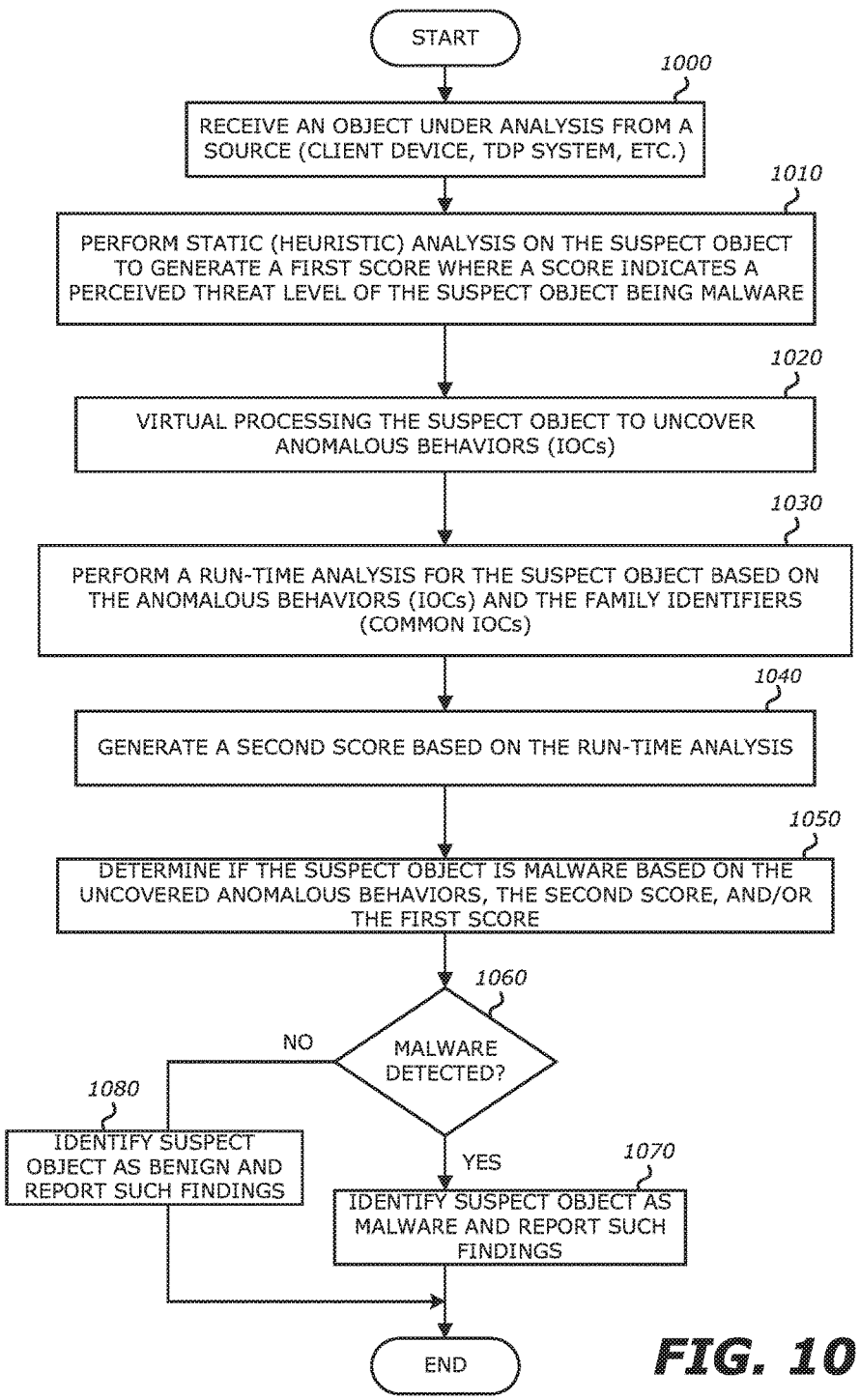
FIG. 10 is an illustrative embodiment of a method for identifying malicious objects supplemented by use of a run-time classifier.

Referring to FIG. 10, an illustrative embodiment of a method for identifying malicious objects supplemented by use of a run-time classifier is shown. Herein, an object is received from a source such as a client device, a TDP system or the like (operation 1000). Upon receipt, the object undergoes static analysis to determine whether the object should undergo further in-depth analysis (e.g., virtual processing within a virtual execution environment) to better determine whether the suspect object is malicious (operation 1010). A first score indicative of a perceived threat level of the suspect object is generated and provided to a score determination logic.

If additional analysis is needed, the suspect object undergoes virtual processing to uncover anomalous behaviors associated with the suspect object in a sandboxed environment (operation 1020). Thereafter, a run-time analysis is conducted based on these anomalous behaviors (IOCs) and the family identifiers (Common IOCs), which represent known malware families (operation 1030). For instance, the run-time classifier may perform a statistical comparison between IOCs and Common IOCs).

Based on the analysis, a second score is output (operation 1040). Where the run-time classification determines that the suspect malware belongs to a classified (APT or non-APT) malware family, at least the name of the particular malware (APT or non-APT) family may be provided along with the second score.

Based on the uncovered anomalous behaviors, and taking in account at least the second score and perhaps the first score (along with any weighting applied to either of these scores), a determination is made as to whether the suspect object is malware (operations 1050). If so, the suspect object is identified as malware, and where the suspect object belongs to a known malware family, the name of the malware family (and other information associated with the identified malware family) may be provided (operations 1060-1070). Otherwise, the suspect object is identified as "benign" and the findings are reported.

Of course, it is contemplated that additional embodiments of the invention may be deployed. As a first example, logic components or the method of operation may be configured to determine whether the suspect object is malicious and also determine the type of malware (e.g. collective functionality of FIGS. 2 and 8). For instance, besides determining that the suspect object is malicious through an overall score as illustrated in FIG. 8, the run-time classifier may further assist the electronic device in determining (and subsequent reporting) whether the suspect object is an APT or a member of an APT family and the particulars of this determination. Other examples may include an embodiment of a first analysis may be conducted as to whether the suspect object includes any malware type (both APT and non-APT) and a subsequent, second analysis may be conducted to determine whether the malware is of a particular type (e.g. APT), or an embodiment where the malware family and APT family determination is conducted in a single operation in lieu of a series of operations, similar to the illustrative embodiment of FIG. 2.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A method for generating an identifier for use in malware detection, comprising:
    obtaining a first plurality of indicators of compromise that correspond to a plurality of anomalous behaviors;
    performing a filtering operation on the first plurality of indicators of compromise by at least removing one or more indicators of compromise from the first plurality of indicators of compromise to create a second plurality of indicators of compromise, wherein the removing of the one or more indicators of compromises comprises (i) maintaining a count value for each of the first plurality of indicators, (ii) removing at least a first indicator of compromise of the one or more indicators of compromise when a count value of the first indicator of compromise exceeds a first threshold that corresponds to a high occurrence rate in one or more known malware families, of a plurality of known malware and (iii) removing at least a second indicator of compromise of the one or more indicators of compromise when a count value of the second indicator of compromise is less than a second threshold that corresponds to a low occurrence rate in the plurality of known malware families; and
    creating the identifier represented by the second plurality of indicators of compromise.

2. The method of claim 1, wherein the obtaining of the first plurality of indicators of compromise comprises executing an object within a virtual environment and detecting the plurality of anomalous behaviors corresponding to the first plurality of indicators of compromise.

3. The method of claim 1, wherein the creating of the identifier comprises
    determining whether the second plurality of indicators of compromise statistically matches indicators of compromise associated with any of a plurality of known malware family identifiers; and
    updating a database including the plurality of known malware family identifies with the identifier upon determining that the second plurality of indicators of compromise statistically matches indicators of compromise associated with a first known malware family identifier of the plurality of known malware family identifiers.

4. The method of claim 1, wherein the second plurality of indicators statistically matches the indicators of compromise associated with the first known malware family identifier when a certain level of correlation between the second plurality of indicators and the indicators of compromise associated with the first known malware family identifier is reached.

5. The method of claim 4, wherein the level of correlation is reached when the second plurality of indicators matches at least ninety percent of the indicators of compromise associated with the first known malware family identifier.

6. The method of claim 1, wherein the first threshold corresponds to the high occurrence rate in a first known malware family of the one or more known malware families and the second threshold corresponds to the low occurrence rate in the plurality of known malware families excluding the first known malware family.

7. The method of claim 1, wherein the creating of the identifier comprises
    determining whether the second plurality of indicators of compromise statistically matches indicators of compromise associated with any of a plurality of known malware family identifiers; and
    reporting results of an analysis of an object for malware by including a first known malware family identifier upon determining that the second plurality of indicators of compromise statistically matches the indicators of compromise associated with the first known malware family identifier of the plurality of known malware family identifiers.

8. The method of claim 7, wherein the indicators of compromise associated with the first known malware family identifier of the plurality of known malware family identifiers includes indicators of compromise associated with an Advanced Persistent Threat (APT) family identifier being an identifier of a malware that targets an entity and may be configured to exfiltrate information that is accessible by the entity.

9. The method of claim 7, wherein the indicators of compromise associated with the first known malware family identifier of the plurality of known malware family identifiers includes indicators of compromise associated with a non-APT family identifier.

10. The method of claim 7, where the reporting of the results of the analysis of the object for malware further comprises reporting that the object includes unknown APT malware upon determining that the second plurality of indicators of compromise fails to statistically match the indicators of compromise associated with any of the plurality of known malware family identifiers.

11. A method for generating an identifier for use in malware detection, comprising:
monitoring behaviors of at least an object executing within a virtual environment to obtain a first plurality of indicators of compromise that correspond to a plurality of anomalous behaviors;
performing a filtering operation on the first plurality of indicators of compromise by at least removing one or more indicators of compromise from the first plurality of indicators of compromise to create a second plurality of indicators of compromise, wherein the removing of the one or more indicators of compromises comprises (i) removing at least a first indicator of compromise of the one or more indicators of compromise when a number of occurrences of the first indicator of compromise in a plurality of known malware families exceeds a first threshold, and (ii) removing at least a second indicator of compromise of the one or more indicators of compromise when a number of occurrences of the second indicator of compromise in the plurality of known malware families falls below a second threshold being less than the first threshold; and
creating the identifier represented by the second plurality of indicators of compromise.

12. The method of claim 11, wherein the obtaining of the first plurality of indicators of compromise comprises executing the object within the virtual environment and detecting the plurality of anomalous behaviors during monitoring of the behaviors of at least the object.

13. The method of claim 11, wherein the performing of the filtering operation comprises
maintaining a count value for each type of indicator of compromise of the first plurality of indicators of compromise; and
removing at least the first indicator of compromise of the one or more indicators of compromise when a count value of the first indicator of compromise exceeds the first threshold.

14. The method of claim 13, wherein the removing of the one or more indicators of compromise further comprises removing at least the second indicator of compromise of the one or more indicators of compromise when a count value of the second indicator of compromise is less than the second threshold.

15. The method of claim 14, wherein the first threshold corresponds to a high occurrence rate in the plurality of known malware families greater than a first prescribed number.

16. The method of claim 15, wherein the second threshold corresponds to a low occurrence rate in the plurality of known malware families less than a second prescribed number that is less than the first prescribed number.

17. The method of claim 12, wherein the creating of the identifier comprises
determining whether the second plurality of indicators of compromise statistically matches indicators of compromise associated with any of the plurality of known malware family identifiers; and
reporting results of an analysis of an object for malware by including a first known malware family identifier upon determining that the second plurality of indicators of compromise statistically matches the indicators of compromise associated with the first known malware family identifier of the plurality of known malware family identifiers.

18. The method of claim 17, wherein the indicators of compromise associated with the first known malware family identifier of the plurality of known malware family identifiers includes indicators of compromise associated with an Advanced Persistent Threat (APT) family identifier.

19. The method of claim 17, wherein the indicators of compromise associated with the first known malware family identifier of the plurality of known malware family identifiers includes indicators of compromise associated with a non-APT family identifier.

20. The method of claim 17, where the reporting of the results of the analysis of the object for malware further comprises reporting that the object includes unknown APT malware upon determining that the second plurality of indicators of compromise fails to statistically match the indicators of compromise associated with any of the plurality of known malware family identifiers.

21. An electronic device, comprising:
a processor; and
a memory communicatively coupled to the processor, the memory comprises a classifier to (i) perform a filtering operation on a first plurality of indicators of compromise by at least removing one or more indicators of compromise from the first plurality of indicators of compromise to create a second plurality of indicators of compromise, and (ii) create an identifier represented by the second plurality of indicators of compromise, wherein the removing of the one or more indicators of compromises comprises (i) removing at least a first indicator of compromise of the one or more indicators of compromise when a number of occurrences of the first indicator of compromise in a plurality of known malware families exceeds a first threshold, and (ii) removing at least a second indicator of compromise of the one or more indicators of compromise when a number of occurrences of the second indicator of compromise in the plurality of known malware families falls below a second threshold being less than the first threshold.

22. The electronic device of claim 21, wherein the memory further comprises one or more virtual machines that execute an object to be analyzed for malware and detect a plurality of anomalous behaviors corresponding to the first plurality of indicators of compromise.

23. The electronic device of claim 21, wherein the classifier configured to perform the filtering operation comprises a counter to maintain a count value for each type of indicator of compromise of the first plurality of indicators of compromise; and a family identifier generator logic to remove at least the first indicator of compromise of the one or more indicators of compromise when a count value of the first indicator of compromise exceeds the first threshold.

24. The electronic device of claim 23, wherein the family identifier generator logic removes the one or more indicators of compromise by at least removing at least the second indicator of compromise of the one or more indicators of compromise when a count value of the second indicator of compromise is less than a second threshold.

25. The electronic device of claim 24, wherein the first threshold corresponds to a high occurrence rate in the plurality of known malware families.

26. The electronic device of claim 25, wherein the second threshold corresponds to a low occurrence rate in the plurality of known malware families.

27. The electronic device of claim 22, wherein the classifier comprises (i) a run-time classifier that, upon execution by the processor, determines whether the second plurality of indicators of compromise statistically matches indicators of compromise associated with any of a plurality of known malware family identifiers, and (ii) reporting logic that, upon execution by the processor, reports results of an analysis of an object for malware by including a first known malware family identifier upon the run-time classifier determining that the second plurality of indicators of compromise statistically matches the indicators of compromise associated with the first known malware family identifier of the plurality of known malware family identifiers.

28. The electronic device of claim 27, wherein the indicators of compromise associated with the first known malware family identifier of the plurality of known malware family identifiers includes indicators of compromise associated with an Advanced Persistent Threat (APT) family identifier.

29. The electronic device of claim 27, wherein the indicators of compromise associated with the first known malware family identifier of the plurality of known malware family identifiers includes indicators of compromise associated with a non-APT family identifier.

30. The electronic device of claim 27, where the reporting logic reports the results of the analysis of the object for malware by at least reporting that the object includes unknown APT malware upon determining by the classifier that the second plurality of indicators of compromise fails to statistically match the indicators of compromise associated with any of the plurality of known malware family identifiers.

31. A method for generating an identifier for use in malware detection, comprising:

obtaining a first plurality of indicators of compromise that correspond to a plurality of behaviors;

performing a filtering operation on the first plurality of indicators of compromise by removing one or more indicators of compromise from the first plurality of indicators of compromise to create a second plurality of indicators of compromise including at least a first indicator of compromise of the one or more indicators of compromise when a count value of the first indicator of compromise exceeds a first threshold; and creating the identifier represented by the second plurality of indicators of compromise by at least determining whether the second plurality of indicators of compromise statistically matches indicators of compromise associated with any of a plurality of known malware family identifiers, wherein a first known malware family identifier of the plurality of known malware family identifiers includes indicators of compromise associated with an Advanced Persistent Threat (APT) family identifier being an identifier of a malware that targets an entity and is configured to surveil, extract or manipulate data to which the entity would have access.

32. The method of claim 31, wherein the performing of the filtering operation comprises maintaining a count value for each type of indicator of compromise of the first plurality of indicators of compromise; and removing at least a first indicator of compromise of the one or more indicators of compromise when a count value of the first indicator of compromise exceeds the first threshold.

33. The method of claim 32, wherein the removing of the one or more indicators of compromise further comprises removing at least a second indicator of compromise of the one or more indicators of compromise when a count value of the second indicator of compromise is less than a second threshold.

34. The method of claim 33, wherein the first threshold corresponds to a high occurrence rate in the first known malware family identifier and the second threshold corresponds to a low occurrence rate in a plurality of known malware families excluding the first known malware family identifier.

* * * * *